United States Patent
Karczewicz et al.

(10) Patent No.: US 10,419,755 B2
(45) Date of Patent: Sep. 17, 2019

(54) CONFUSION OF MULTIPLE FILTERS IN ADAPTIVE LOOP FILTERING IN VIDEO CODING

(71) Applicant: QUALCOMM Incorporated, San Diego, CA (US)

(72) Inventors: Marta Karczewicz, San Diego, CA (US); Li Zhang, San Diego, CA (US); Wei-Jung Chien, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 248 days.

(21) Appl. No.: 15/595,018

(22) Filed: May 15, 2017

(65) Prior Publication Data

US 2017/0332075 A1 Nov. 16, 2017

Related U.S. Application Data

(60) Provisional application No. 62/440,877, filed on Dec. 30, 2016, provisional application No. 62/337,243, filed on May 16, 2016.

(51) Int. Cl.
*H04N 19/117* (2014.01)
*H04N 19/61* (2014.01)
(Continued)

(52) U.S. Cl.
CPC ......... *H04N 19/117* (2014.11); *H04N 19/107* (2014.11); *H04N 19/172* (2014.11);
(Continued)

(58) Field of Classification Search
CPC ...... H04N 19/117; H04N 19/61; H04N 19/42; H04N 19/176; H04N 19/172; H04N 19/82; H04N 19/107; H04N 19/00587
See application file for complete search history.

(56) References Cited

U.S. PATENT DOCUMENTS

| | | | |
|---|---|---|---|
| 7,065,212 B1* | 6/2006 | Yu | G06T 1/0028 375/E7.029 |
| 8,295,633 B2* | 10/2012 | Sangkeun | H04N 19/117 375/240.27 |

(Continued)

FOREIGN PATENT DOCUMENTS

| | | |
|---|---|---|
| EP | 1545134 A2 | 6/2005 |
| EP | 2466890 A2 | 6/2012 |

(Continued)

OTHER PUBLICATIONS

International Search Report and Written Opinion for corresponding PCT Application No. PCT/US2017/032853, dated Aug. 4, 2017, 11pp.

(Continued)

*Primary Examiner* — Bobbak Safaipour
(74) *Attorney, Agent, or Firm* — Shumaker & Sieffert, P.A.

(57) ABSTRACT

An apparatus for encoding or decoding video data reconstructs one or more blocks of a current picture of the video data. The one or more blocks of the current picture comprise reconstructed samples of the current picture. In addition, after reconstructing the one or more blocks of the current picture, the apparatus applies a particular function of a plurality of filters to a current block of the current picture. The current block comprising the reconstructed samples of the current picture.

49 Claims, 10 Drawing Sheets

(51) Int. Cl.
H04N 19/42 (2014.01)
H04N 19/176 (2014.01)
H04N 19/172 (2014.01)
H04N 19/82 (2014.01)
H04N 19/107 (2014.01)
H04N 19/70 (2014.01)

(52) U.S. Cl.
CPC ......... H04N 19/176 (2014.11); H04N 19/439 (2014.11); H04N 19/61 (2014.11); H04N 19/70 (2014.11); H04N 19/82 (2014.11)

(56) References Cited

U.S. PATENT DOCUMENTS

| | | | | |
|---|---|---|---|---|
| 9,819,966 | B2* | 11/2017 | Chong | H04N 19/176 |
| 10,009,621 | B2* | 6/2018 | Zhang | H04N 19/52 |
| 10,223,612 | B2* | 3/2019 | Hua | G06K 9/6257 |
| 2011/0228854 | A1 | 9/2011 | Shin et al. | |
| 2011/0305277 | A1* | 12/2011 | Fu | H04N 5/21 375/240.12 |
| 2012/0051438 | A1* | 3/2012 | Chong | H04N 19/176 375/240.25 |
| 2012/0082241 | A1* | 4/2012 | Tsai | H04N 19/176 375/240.25 |
| 2012/0140820 | A1* | 6/2012 | Kondo | H04N 19/176 375/240.03 |
| 2012/0170645 | A1 | 7/2012 | Chien et al. | |
| 2012/0170652 | A1* | 7/2012 | Guo | H04N 19/176 375/240.12 |
| 2014/0146875 | A1* | 5/2014 | Chong | H04N 19/159 375/240.02 |
| 2017/0238020 | A1 | 8/2017 | Karczewicz et al. | |

FOREIGN PATENT DOCUMENTS

| | | |
|---|---|---|
| EP | 2709364 A1 | 3/2014 |
| WO | 2009131508 A2 | 10/2009 |
| WO | 2010134973 A1 | 11/2010 |

OTHER PUBLICATIONS

Karczewicz M., et al., "Improvements on Adaptive Loop Filter", 2. JVET Meeting, Feb. 20, 2016-Feb. 26, 2016, San Diego, (The Joint Video Exploration Team of ISO/IEC JTC1/SC29/WG11 and ITU-T SG.16 ), No. JVET-80060-v2, Feb. 20, 2016 (Feb. 20, 2016), XP030150068, URL: http://PHENIX.INT-EVRY.FR/JVET/.

Wiegand, et al., "WD3: Working Draft 3 of High-Efficiency Video Coding", Joint Collaborative Team on Video Coding (JCT-VC) of ITU-T SG16 WP3 and ISO/IEC JTC1/SC29/WG11 5th Meeting: Geneva, CH, Mar. 16-23, 2011, JCTVC-E603, http://phenix.itsudparis.eu/jctldoc_end_user/documents/5_Geneva/wg11/JCTVC-E603-v8.zip, Jun. 27, 2011, 68 pp.

Wang Y-K. et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages.

Chen et al., "Algorithm Description of Joint Exploration Test Model 2" Joint Video Exploration Team (JVET) of ITU-T SG 16 WP 3 and ISO/IEC JTC 1/SC 29/WG 11, 2nd Meeting: San Diego, Feb. 20-26, 2016, JVET-B1001-v3, 32 pp.

Chen et al. "Coding tools investigation for next generation video coding", International Telecommunication Union Standardization Sector, ITU-T/Study Group 16—Contribution 806, Doc. COM 16—C806-E, Jan. 2015, 7 pp.

"Golomb coding," accessed from https://en.wikipedia.org/wiki/Golomb_coding, accessed on May 9, 2016, 8 pp.

Karczewicz, et al., "Geometry Transformation-based Adaptive In-Loop Filter," Picture Coding Symposium (PCS), 2016, Dec. 4-7, 2016, 5 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Chen, et al., "Algorithm Description of Joint Exploration Test Model 6 (JEM 6)," Joint Video Exploration Team (JVET) of ITU-T SG 16 WP 3 and ISO/IEC JTC 1/SC 29/WG 11, 6th Meeting; Hobart, AU, Mar. 31-Apr. 7, 2017, Document: JVET-F1001_v3, Jun. 30, 2017, 48 pp.

Karczewicz M., et al., "EE2.5: Improvements on adaptive loop filter," Joint Video Exploration Team (JVET) of ITU-T SG 16 WP 3 and ISO/IEC JTC 1/SC 29/WG 11, 3rd Meeting: Geneva, CH, Document: JVET-O0038, May 26-Jun. 1, 2016, pp. 1-4.

International Preliminary Report on Patentability from International Application No. PCT/US2017/032853, dated Nov. 29, 2018, 8 pp.

* cited by examiner

Current block

CONFUSION OF MULTIPLE FILTERS IN ADAPTIVE LOOP FILTERING IN VIDEO CODING This application claims the benefit of U.S. Provisional Patent Application 62/337,243, filed May 16, 2016, and U.S. Provisional Patent Application 62/440,877, filed Dec. 30, 2016, the entire content of each of which is incorporated herein by reference.

TECHNICAL FIELD

This disclosure relates to computing devices that perform video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the ITU-T H.265, High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized.

SUMMARY

In general, this disclosure describes techniques related to computing devices that perform adaptive loop filtering (ALF), including techniques for coding the side information for transmitting the filters. Such techniques may be used in the context of advanced video codecs, such as extensions of High Efficiency Video Coding (HEVC) or the next generation of video coding standards. Such techniques may be used in other filtering methods which signal side information for transmitting filters.

In one example, this disclosure describes a method of decoding or encoding video data, the method comprising: reconstructing, by a computing device, one or more blocks of a current picture of the video data, the one or more blocks of the current picture comprising reconstructed samples of the current picture; and after reconstructing the one or more blocks of the current picture, applying, by the computing device, a particular function of a plurality of filters to a current block of the current picture, the current block comprising the reconstructed samples of the current picture.

In another example, this disclosure describes an apparatus for decoding or encoding video data, the apparatus comprising: one or more processors configured to: reconstruct one or more blocks of a current picture of the video data, the one or more blocks of the current picture comprising reconstructed samples of the current picture; and after reconstructing the one or more blocks of the current picture, apply a particular function of a plurality of filters to a current block of the current picture, the current block comprising the reconstructed samples of the current picture.

In another example, this disclosure describes an apparatus for decoding or encoding video data, the apparatus comprising: means for reconstructing one or more blocks of a current picture of the video data, the one or more blocks of the current picture comprising reconstructed samples of the current picture; and means for applying, after reconstructing the current picture, a particular function of a plurality of filters to a current block of the current picture, the current block comprising the reconstructed samples of the current picture.

In another example, this disclosure describes a computer-readable data storage medium having instructions stored thereon that, when executed, configure a device for decoding or encoding video data to: reconstruct one or more blocks of a current picture of the video data, the one or more blocks of the current picture comprising reconstructed samples of the current picture; and after reconstructing the one or more blocks of the current picture, apply a particular function of a plurality of filters to a current block of the current picture, the current block comprising the reconstructed samples of the current picture.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Figure 1:
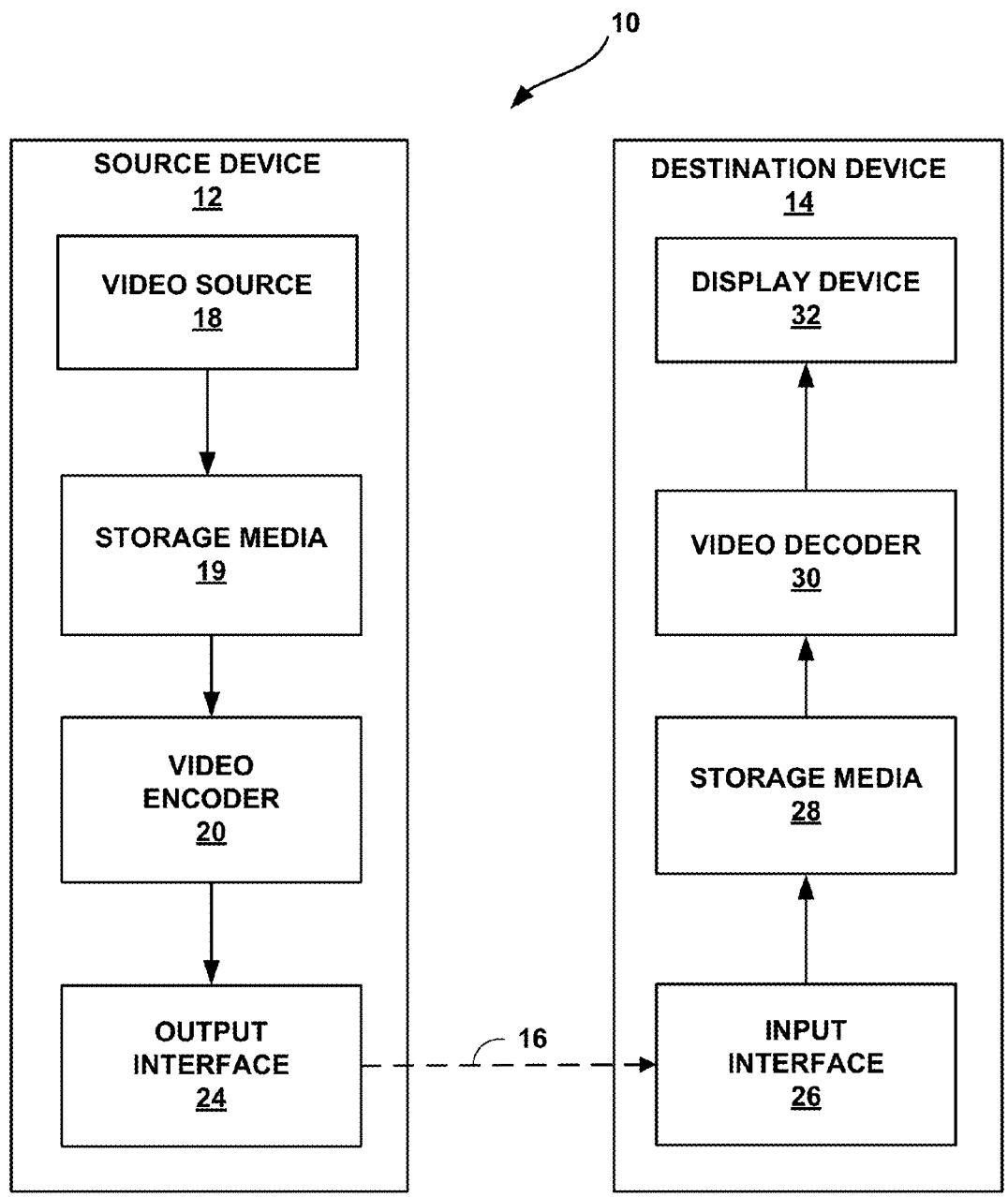
FIG. 1 is a block diagram illustrating an example video encoding and decoding system that may utilize one or more techniques described in this disclosure.

Video coding typically involves predicting a block of video data from either an already coded block of video data in the same picture (i.e. intra prediction) or an already coded block of video data in a different picture (i.e. inter prediction). In some instances, the video encoder also calculates residual data by comparing the predictive block to the original block. Thus, the residual data represents a difference between the predictive block and the original block. The video encoder transforms and quantizes the residual data and signals the transformed and quantized residual data in the encoded bitstream. A video decoder adds the residual data to the predictive block to produce a reconstructed video block that matches the original video block more closely than the predictive block alone. To further improve the quality of decoded video, a video decoder can perform one or more filtering operations on the reconstructed video blocks. Examples of these filtering operations include deblocking filtering, sample adaptive offset (SAO) filtering, and adaptive loop filtering (ALF). Parameters for these filtering operations may either be determined by a video encoder and explicitly signaled in the encoded video bitstream or may be implicitly determined by a video decoder.

A picture comprises one or more sample arrays. Each of the sample arrays corresponds to a different color component, such as a luma component or a chroma component. When a video coder (e.g., a video encoder or a video decoder) applies an ALF, the video coder may partition a sample array of a picture into equally-sized blocks, such as 4×4 blocks. For each respective block, the video coder assigns to the respective block a direction value from a set of allowed direction values. Additionally, for each respective block, the video coder assigns to the respective block an activity value from a set of allowed activity values. In some prior proposals, the set of allowed direction values is limited to 3 direction values and the set of allowed activity values is limited to 5 activity values. Thus, in such proposals, there may be a total of 15 combinations of direction values and activity values.

Each of the combinations may be referred to as a group (or named a class). Thus, each of the blocks may be said to belong to one of the groups. Each of the groups may be associated with a set of ALF coefficients (or named a set of filter coefficients). The set of ALF coefficients associated with the groups may be signaled or predefined. The video coder applies, to the samples of a block, a filter using the set of ALF coefficients associated with the group to which the block belongs.

Limiting the allowed direction values to 3 and the allowed activity values to 5 may limit the performance of the ALF filter, which may decrease compression efficiency. In contrast, increased compression efficiency may allow decoding devices to display higher-quality video data with an equivalent amount of data, allow decoding devices to access encoded video data faster, or potentially provide other improvements to such decoding devices. Limiting the allowed direction values to 3 and the allowed activity values to 5 may limit the performance of the ALF filter especially in instances where characteristics of a block are close to a threshold at which the block is assigned a different direction value from the set of allowed direction values or assigned a different direction value from the set of allowed activity values. However, using more than 15 groups may result in more sets of ALF coefficients being signaled, which may also decrease compression efficiency. Storing and signaling additional sets of ALF coefficients may increase hardware complexity, reduce available memory, prolong times required by a computing device to display video data in response to a request, and so on.

Techniques of this disclosure may address these challenges. For example, instead of applying one filter to the samples of a block, a video coder may apply a confusion of multiple filters to the samples of the block. In the context of this disclosure, the term "confusion" is applied in the sense of using together or mixing. For instance, the video coder may apply a linear function of multiple filters to the samples of the block. Thus, the number of sets of ALF filters to be transmitted may not need to increase, while at the same time, application of a confusion of multiple filters may address the limitation on the number of possible filters imposed by the numbers of allowed direction values and allowed activity values. Thus, as described in this disclosure, a video coder (i.e., a video encoder or a video decoder) may reconstruct samples of a current picture of the video data. Additionally, after reconstructing the samples of the current picture, the video coder may apply a particular function of a plurality of filters to a current block of the current picture. In this way, the video coder may in effect generate a new filter according to the particular function, and apply the new filter to the current block. The current block comprises the reconstructed samples.

FIG. 1 is a block diagram illustrating an example video encoding and decoding system 10 that may utilize techniques of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of computing devices, including desktop computers, notebook (i.e., laptop) computers, tablet computers, set-top boxes, telephone handsets such as so-called "smart" phones, tablet computers, televisions, cameras, display devices, digital media players, video gaming consoles, video streaming device, or the like. In some cases, source device 12 and destination device 14 may be equipped for wireless communication. Thus, source device 12 and destination device 14 may be wireless communication devices. Source device 12 is an example video encoding device (i.e., a device for encoding video data). Destination device 14 is an example video decoding device (i.e., a device for decoding video data).

In the example of FIG. 1, source device 12 includes a video source 18, storage media 19 configured to store video data, a video encoder 20, and an output interface 24. Destination device 14 includes an input interface 26, a storage media 28 configured to store encoded video data, a video decoder 30, and display device 32. In other examples, source device 12 and destination device 14 include other components or arrangements. For example, source device 12 may receive video data from an external video source, such as an external camera. Likewise, destination device 14 may interface with an external display device, rather than including an integrated display device.

The illustrated system 10 of FIG. 1 is merely one example. Techniques for processing video data may be performed by any digital video encoding and/or decoding device. Although generally the techniques of this disclosure are performed by a video encoding device, the techniques may also be performed by a video encoder/decoder, typically referred to as a "CODEC." Source device 12 and destination device 14 are merely examples of such coding devices in which source device 12 generates coded video data for transmission to destination device 14. In some examples, source device 12 and destination device 14 may operate in a substantially symmetrical manner such that each of source device 12 and destination device 14 include video encoding and decoding components. Hence, system 10 may support one-way or two-way video transmission between source device 12 and destination device 14, e.g., for video streaming, video playback, video broadcasting, or video telephony.

Video source 18 of source device 12 may include a video capture device, such as a video camera, a video archive containing previously captured video, and/or a video feed interface to receive video data from a video content provider. As a further alternative, video source 18 may generate computer graphics-based data as the source video, or a combination of live video, archived video, and computer-generated video. Source device 12 may comprise one or more data storage media (e.g., storage media 19) configured to store the video data. The techniques described in this disclosure may be applicable to video coding in general, and may be applied to wireless and/or wired applications. In each case, the captured, pre-captured, or computer-generated video may be encoded by video encoder 20. Output interface 24 may output the encoded video information to a computer-readable medium 16.

Destination device 14 may receive the encoded video data to be decoded via computer-readable medium 16. Computer-readable medium 16 may comprise any type of medium or device capable of moving the encoded video data from source device 12 to destination device 14. In some examples, computer-readable medium 16 comprises a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Destination device 14 may comprise one or more data storage media configured to store encoded video data and decoded video data.

In some examples, encoded data may be output from output interface 24 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 26 of destination device 14 receives information from computer-readable medium 16. The information of computer-readable medium 16 may include syntax information defined by video encoder 20 of video encoder 20, which is also used by video decoder 30, that includes syntax elements that describe characteristics and/or processing of blocks and other coded units, e.g., groups of pictures (GOPs). Storage media 28 may be configured to store encoded video data, such as encoded video data (e.g., a bitstream) received by input interface 26. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In some examples, video encoder 20 and video decoder 30 may operate according to a video coding standard such as an existing or future standard. Example video coding standards include, but are not limited to, ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions. In addition, a new video coding standard, namely High Efficiency Video Coding (HEVC) or ITU-T H.265, including its range and screen content coding extensions, 3D video coding (3D-HEVC) and multiview extensions (MV-HEVC) and scalable extension (SHVC), has recently been developed by the Joint Collaboration Team on Video Coding (JCT-VC) of ITU-T Video Coding Experts Group (VCEG) and ISO/IEC Motion Picture Experts Group (MPEG).

Wang et al., High Efficiency Video Coding (HEVC) Defect Report," Joint Collaborative Team on Video Coding (JCT-VC) of ITU-T SG 16 WP 3 and ISO/IEC JTC 1/SC 29/WG 11, 14$^{th}$ Meeting, Vienna, AT, 25 Jul.-2 Aug. 2013, is a draft specification of HEVC, and referred to as HEVC WD hereinafter. HEVC WD is available from http://phenix.int-evry.fr/jct/doc_end_user/documents/14_Vienna/wg11/JCTVC-N1003-v1.zip. The HEVC standard was finalized in January 2013.

ITU-T VCEG (Q6/16) and ISO/IEC MPEG (JTC 1/SC 29/WG 11) are now studying the potential need for standardization of future video coding technology with a compression capability that significantly exceeds that of the current HEVC standard, including HEVC's current extensions and near-term extensions for screen content coding and high-dynamic-range coding. The groups are working together on this exploration activity in a joint collaboration effort known as the Joint Video Exploration Team (JVET) to evaluate compression technology designs proposed by their experts in this area. The JVET first met during 19-21 Oct. 2015. The latest version of reference software, i.e., Joint Exploration Model 2 (JEM 2) can be downloaded from: https://jvet.hhi.fraunhofer.de/svn/svn_HMJEMSoftware/tags/HM-16.6-JEM-2.0/J. Chen et al. "Algorithm description of Joint Exploration Test Model 2", JVET-B1001, San Diego, March 2016 (hereinafter, "JVET-B1001") contains a description of the algorithm for JEM2, which may also be referred to as JEM2.0.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions. Example types of video blocks may include coding tree blocks, coding blocks, and other types of blocks of video data.

Video encoder 20 may encode blocks of a picture of the video data. Video encoder 20 may include, in a bitstream, an encoded representation of the video block. For instance, to generate a coded CTU of a picture, video encoder 20 may recursively perform quad-tree partitioning on the coding tree blocks of a CTU to divide the coding tree blocks into coding blocks, hence the name "coding tree units." In quad-tree partitioning, a block is divided into four equally-sized sub-blocks, any of which may be further partitioned into four equally-sized sub-sub-blocks, and so on. A coding block is an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Furthermore, video encoder 20 may encode a CU. For instance, to encode a CU, video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive blocks (e.g., luma, Cb, and Cr predictive blocks) for prediction blocks (e.g., luma, Cb, and Cr prediction blocks) of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture that includes the PU.

Video encoder 20 may generate one or more residual blocks for the CU. For instance, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the Cb residual block of a CU may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the residual blocks (e.g., the luma, Cb, and Cr residual blocks) of a CU into one or more transform blocks (e.g., luma, Cb, and Cr transform blocks). In other words, video encoder 20 may partition the residual blocks according to a residual quad-tree (RQT). A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

As mentioned above, video encoder 20 may generate data that represent a RQT for a CU. The RQT for the CU comprises a set of nodes. Each of the nodes corresponds to a residual sample block. A root node of the RQT corresponds to the residual block of the CU. Leaf nodes of the RQT correspond to the transform blocks of TUs of the CU. Nodes of the RQT may be associated with split flags. The split flag of a node may indicate whether the node has a plurality of child nodes of the RQT.

Furthermore, in addition to being associated with split flags, nodes of the RQT is associated with a luma coded block flag (CBF) that indicates whether the leaf node is associated with a significant (non-zero) luma transform block. In some examples, only leaf nodes of the RQT are associated with luma CBFs. In addition to split flags and luma CBFs, the nodes of the RQT may also be associated with chroma CBFs (e.g., Cb CBFs and Cr CBFs). A Cb CBF of a node indicates whether the node, or any descendant node of the node, is associated with a significant Cb transform block. A first node may be a descendant node of a second node if the second node is the root node of the RQT or there is a path through the RQT from the first node to the root node that passes through the second node and does not pass through any node more than once. A Cr CBF of a node indicates whether the node, or any descendant node of the node, is associated with a significant Cr transform block.

Video encoder 20 may apply one or more transforms a transform block of a TU to generate a coefficient block for the TU. For instance, video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU. In some examples, video encoder 20 skips application of the transforms to the transform block.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. In some examples, quantization is skipped. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes encoded video data. For example, the bitstream may comprise a sequence of bits that forms a representation of coded pictures and associated data. Thus, the bitstream comprises an encoded representation of video data. In some examples, a representation of a coded picture may include encoded representations of blocks. Thus, video encoder 20 may signal, in the bitstream, transform coefficients of a block in an encoded representation of the block. In some instances, video encoder 20 may use one or more syntax elements to signal each transform coefficient of the block.

The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and encapsulates a RBSP. The NAL unit header may include a syntax element indicating a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize coefficient blocks of TUs of the current CU.

Video decoder 30 may perform inverse transforms on the coefficient blocks to reconstruct transform blocks of the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In some examples, video encoder 20 may signal motion information of a block (e.g., PU) using merge/skip mode or advanced motion vector prediction (AMVP) mode. For instance, in HEVC, there are two modes for the prediction of motion parameters, one being the merge/skip mode and the other being AMVP. Motion prediction may comprise the determination of motion information of a video unit (e.g., a PU) based on motion information of one or more other video units. The motion information of a PU may include motion vector(s) of the PU, reference index(es) of the PU, and one or more prediction direction indicators.

When video encoder 20 signals the motion information of a current PU using merge mode, video encoder 20 generates a merge candidate list. In other words, video encoder 20 may perform a motion vector predictor list construction process. The merge candidate list includes a set of merge candidates that indicate the motion information of PUs that spatially or temporally neighbor the current PU. That is, in the merge mode, a candidate list of motion parameters (e.g., reference indexes, motion vectors, etc.) is constructed where a candidate can be from spatial and temporal neighboring blocks.

Furthermore, in merge mode, video encoder 20 may select a merge candidate from the merge candidate list and may use the motion information indicated by the selected merge candidate as the motion information of the current PU. Video encoder 20 may signal the position in the merge candidate list of the selected merge candidate. For instance, video encoder 20 may signal the selected motion vector parameters by transmitting an index (i.e., a merging candidate index) that indicates a position within the candidate list of the selected merge candidate. Video decoder 30 may obtain, from the bitstream, the index into the candidate list (i.e., the merging candidate index). In addition, video decoder 30 may generate the same merge candidate list and may determine, based on the merging candidate index, the selected merge candidate. Video decoder 30 may then use the motion information of the selected merge candidate to generate predictive blocks for the current PU. That is, video decoder 30 may determine, based at least in part on the candidate list index, a selected candidate in the candidate list, wherein the selected candidate specifies the motion vector for the current PU. In this way, at the decoder side, once the index is decoded, all motion parameters of the corresponding block where the index points may be inherited by the current PU.

Skip mode is similar to merge mode. In skip mode, video encoder 20 and video decoder 30 generate and use a merge candidate list in the same way that video encoder 20 and video decoder 30 use the merge candidate list in merge mode. However, when video encoder 20 signals the motion information of a current PU using skip mode, video encoder 20 does not signal any residual data for the current PU. Accordingly, video decoder 30 may determine, without use of residual data, a prediction block for the PU based on a reference block indicated by the motion information of a selected candidate in the merge candidate list.

AMVP mode is similar to merge mode in that video encoder 20 may generate a candidate list and may select a candidate from the candidate list. However, when video encoder 20 signals the RefPicListX (where X is 0 or 1) motion information of a current PU using AMVP mode, video encoder 20 may signal a RefPicListX motion vector difference (MVD) for the current PU and a RefPicListX reference index for the current PU in addition to signaling a RefPicListX motion vector predictor (MVP) index (e.g., flag or indicator) for the current PU. The RefPicListX MVP index for the current PU may indicate the position of a selected AMVP candidate in the AMVP candidate list. The RefPicListX MVD for the current PU may indicate a difference between a RefPicListX motion vector of the current PU and a motion vector of the selected AMVP candidate. In this way, video encoder 20 may signal the RefPicListX motion information of the current PU by signaling a RefPicListX MVP index, a RefPicListX reference index value, and a RefPicListX MVD. In other words, the data in the bitstream representing the motion vector for the current PU may include data representing a reference index, an index to a candidate list, and an MVD. Thus, the chosen motion vectors may be signaled by transmitting an index into the candidate list. In addition, the reference index values and motion vector differences may also be signaled.

Furthermore, when the motion information of a current PU is signaled using AMVP mode, video decoder 30 may obtain, from the bitstream, a MVD for a current PU and a MVP flag. Video decoder 30 may generate the same AMVP candidate list and may determine, based on the MVP flag, the selected AMVP candidate. In other words, in AMVP, a candidate list of motion vector predictors for each motion hypothesis is derived based on the coded reference index. As before, this list may include motion vectors of neighboring blocks that are associated with the same reference index as well as a temporal motion vector predictor which is derived based on the motion parameters of the neighboring block of the co-located block in a temporal reference picture. Video decoder 30 may recover a motion vector of the current PU by adding the MVD to the motion vector indicated by the selected AMVP candidate. That is, video decoder 30 may determine, based on a motion vector indicated by the selected AMVP candidate and the MVD, the motion vector of the current PU. Video decoder 30 may then use the recovered motion vector or motion vectors of the current PU to generate predictive blocks for the current PU.

When a video coder (e.g., video encoder 20 or video decoder 30) generates an AMVP candidate list for a current PU, the video coder may derive one or more AMVP candidates based on the motion information of PUs (i.e., spatially-neighboring PUs) that cover locations that spatially neighbor the current PU and one or more AMVP candidates based on motion information of PUs that temporally neighbor the current PU. In this disclosure, a PU (or other type of video unit) may be said to "cover" a location if a prediction block of the PU (or other type of sample block of the video unit) includes the location. The candidate list may include motion vectors of neighboring blocks that are associated with the same reference index as well as a temporal motion vector predictor which is derived based on the motion parameters (i.e., motion information) of the neighboring block of the co-located block in a temporal reference picture. A candidate in a merge candidate list or an AMVP candidate list that is based on the motion information of a PU that temporally neighbors a current PU (i.e., a PU that is in a different time instance than the current PU) may be referred to as a TMVP. A TMVP may be used to improve the coding efficiency of HEVC and, different from other coding tools, a TMVP may need to access a motion vector of a frame in a decoded picture buffer, more specifically in a reference picture list.

As noted above, a bitstream may include a representation of encoded pictures of the video data and associated data. The associated data may include parameter sets. In HEVC and other video coding specifications, NAL units may encapsulate RBSP s for video parameter sets (VPSs), sequence parameter sets (SPSs), and picture parameter sets (PPSs). A VPS is a syntax structure comprising syntax elements that apply to zero or more entire coded video sequences (CVSs). An SPS is also a syntax structure comprising syntax elements that apply to zero or more entire CVSs. An SPS may include a syntax element that identifies a VPS that is active when the SPS is active. Thus, the syntax elements of a VPS may be more generally applicable than the syntax elements of an SPS. A PPS is a syntax structure comprising syntax elements that apply to zero or more coded pictures. A PPS may include a syntax element that identifies an SPS that is active when the PPS is active. A slice header of a slice may include a syntax element that indicates a PPS that is active when the slice is being coded.

In the field of video coding, it is common to apply filtering in order to enhance the quality of a decoded video signal. The filter can be applied as a post-loop filter, where a filtered frame is not used for prediction of future frames or as an in-loop filter, where a filtered frame is used to predict future frame. For example, a filter can be designed by minimizing the error between the original signal and the decoded filtered signal. For instance, a filter can be designed for minimizing the error (e.g., difference) between an original picture and a reconstructed version of the same picture. The in-loop adaptive filter (e.g., adaptive loop filter (ALF)) was evaluated during the development stage of HEVC, but not included in the final version of HEVC.

A filter, such as an ALF, may have one or more coefficients. Similar to transform coefficients, the coefficients of the filter h(k, l), where k=−K, . . . , K and l=−K, . . . K, may be quantized as follows:

$$f(k,l) = \text{round}(\text{normFactor} \cdot h(k,l))$$

and then coded and sent to video decoder 30. The normFactor is usually equal to $2^n$. The larger the value of normFactor, the more precise is the quantization, and the quantized filter coefficients f(k, l) provide better performance. On the other hand, larger values of normFactor produce coefficients f(k, l) requiring more bits to transmit. The value K may be an integer.

A video decoder, such as video decoder 30 or a reconstruction loop of video encoder 20, may apply the decoded filter coefficients f(k, l) to the reconstructed image R(i, j) as follows:

$$\tilde{R}(i, j) = \sum_{k=-K}^{K} \sum_{l=-K}^{K} f(k, l) R(i+k, j+l) \Big/ \sum_{k=-k}^{K} \sum_{l=-K}^{K} f(k, l), \quad (1)$$

In equation (1), above, i and j are the coordinates of the pixels within the frame. In equation (1), R(i, j) is an unfiltered value of a sample of the reconstructed picture at coordinates (i, j) and $\tilde{R}(i, j)$ indicates a filtered value of the sample at coordinates (i, j).

The in-loop adaptive loop filter employed in the JEM was originally proposed in J. Chen et al., "Coding tools investigation for next generation video coding", SG16-Geneva-C806, January 2015. The basic idea is the same as the ALF with block-based adaptation in HM-3 (T. Wiegand et al., "WD3: Working Draft 3 of High-Efficiency Video Coding," Joint Collaborative Team on Video Coding (JCT-VC) of ITU-T SG16 WP3 and ISO/IEC JTC1/SC29/WG11, JCTVC-E603, 5th Meeting: Geneva, CH, 16-23 Mar. 2011, hereinafter, JCTVC-E603).

For the luma component, 4×4 blocks in the whole picture are classified based on 1-dimensional (1D) Laplacian direction (up to 3 directions) and 2-dimensional (2D) Laplacian activity (up to 5 activity values). The rule for classification is also named as 'matrix'. The calculation of direction, denoted $Dir_b$, and un-quantized activity, denoted $Act_b$, are shown in equations (2) through (5), where $\hat{I}_{i,j}$ indicates a reconstructed pixel or sample with relative coordinate (i, j) to the top-left of a 4×4 block. $Act_b$ may be further quantized to the range of 0 to 4 inclusively as described in JCTVC-E603.

$$V_{i,j} = |\hat{I}_{i,j} \times 2 - \hat{I}_{i,j-1} - \hat{I}_{i,j+1}| \quad (2)$$

$$H_{i,j} = |\hat{I}_{i,j} \times 2 - \hat{I}_{i-1,j} - \hat{I}_{i+1,j}| \quad (3)$$

$$Dir_b = \begin{cases} 1, & \text{if } \left(\sum_{i=0}^{3}\sum_{j=0}^{3} H_{i,j} > 2 \times \sum_{i=0}^{3}\sum_{j=0}^{3} V_{i,j}\right) \\ 2, & \text{if } \left(\sum_{i=0}^{3}\sum_{j=0}^{3} V_{i,j} > 2 \times \sum_{i=0}^{3}\sum_{j=0}^{3} H_{i,j}\right) \\ 0, & \text{otherwise} \end{cases} \quad (4)$$

$$Act_b = \sum_{i=0}^{3}\sum_{j=0}^{3} \left(\sum_{m=i-1}^{i+1}\sum_{n=j-1}^{j+1} (V_{m,n} + H_{m,n})\right) \quad (5)$$

In total, each block can be categorized into one of 15 (i.e., 5×3) groups and an index is assigned to each 4×4 block according to the value of $Dir_b$ and $Act_b$ of the block. The group index, denoted by C, is set equal to $5Dir_b + \hat{A}$, wherein $\hat{A}$ is the quantized value of $Act_b$. Therefore, up to 15 sets of ALF parameters can be signalled for the luma component of a picture.

Figure 2:
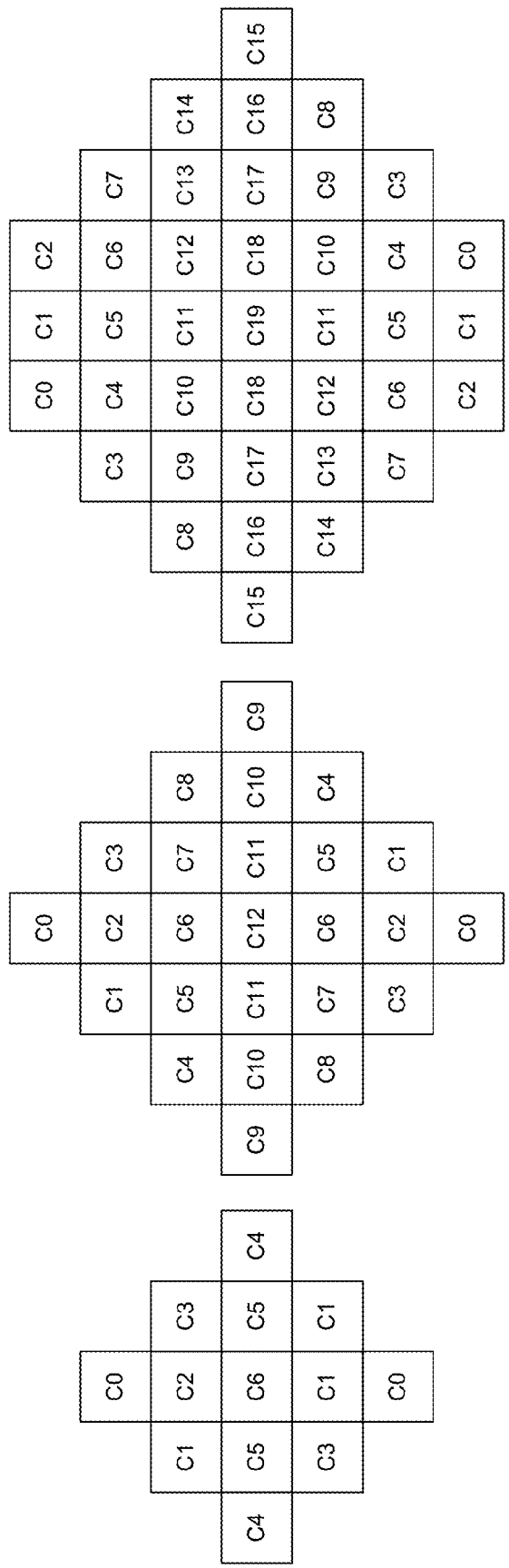
FIG. 2 is a conceptual diagram illustrating example Adaptive Loop Filter (ALF) filter supports.

To save the signaling cost, the groups may be merged along group index value. That is, groups with consecutive group indices may be merged to one merged group. For each merged group, a set of ALF coefficients is signaled. Up to three circular symmetric filter shapes (as shown in FIG. 2) are supported. In the example of FIG. 2, the left portion is a 5×5 diamond, the middle portion is a 7×7 diamond, and the right portion is a truncated 9×9 diamond. For both chroma components in a picture, a single set of ALF coefficients is applied and the 5×5 diamond shape filter is always used.

At the decoder side, each pixel sample $\hat{I}_{i,j}$ is filtered, resulting in pixel value $I'_{i,j}$ as shown in equation (6), where L denotes filter length, $f_{m,n}$ represents filter coefficient and o indicates filter offset.

$$I'_{i,j} = (\sum_{m=-L}^{L}\sum_{n=-L}^{L} f_{m,n} \times \hat{I}_{i+m,j+n} + o) >> (BD_F - 1), \quad (6)$$

wherein $(1<<(BD_F-1)) = \sum_{m=-L}^{L}\sum_{n=-L}^{L} f(m,n)$ and $(o = (1 << (BD_F - 2)))$ and $BD_F$ is the bit depth. In the current JEM2, the bit-depth is set to 9, which means the filter coefficient could be in the range of [−256, 256]. For the current design, only up to one filter is supported for two chroma components.

In JEM2, several syntax elements and/or methods may be used to signal filter coefficients, including but not limited to one or more of the following:

Total Number of Filters:

The total number of filters (or total number of merged groups) is firstly signaled when ALF is enabled for one slice.

It is applied to the luma component. For chroma components, since only one filter may be applied, there is no need to signal such information.

Filter Support:

An index of the three filter supports is signaled.

Filter Index:

Classes which have non-consecutive values of C could be merged, i.e., share the same filter. By coding one flag of each class to indicate it is merged or not, the filter index could be derived.

forceCoeff0 flag:

The forceCoeff0 flag is used to indicate whether at least one of the filters should not be coded. When this flag is equal 0, all of the filters should be coded. When this flag is equal 1, one flag of each merged group, denoted by CodedVarBin, is further signaled to indicate the filter should be signaled or not. When a filter is not signaled, all of the filter coefficients associated with the filter are equal to 0.

Prediction Method:

When multiple groups of filters need to be signaled, one of the two following techniques could be used:

All the filters are coded directly into the filter information. In this case, for example, the values of filter coefficients may be encoded into the bitstream without using any predictive encoding techniques.

The filter coefficients of the first filter are coded directly. While for the remaining filters, they are predictively coded into the filter information. In this case, the values of filter coefficients may be defined by residual values or differences relative to the filter coefficients associated with a previously coded filter. The previously coded filter is the one that is the most recent one, i.e., the filter indices of current filter and its predictor are consecutive.

To indicate the usage of one of the above two methods, one flag is coded when the number of merged groups is larger than 1 and froceCoeff0 is equal to 0.

Filter Coefficients with Golomb Coding

Figure 3:
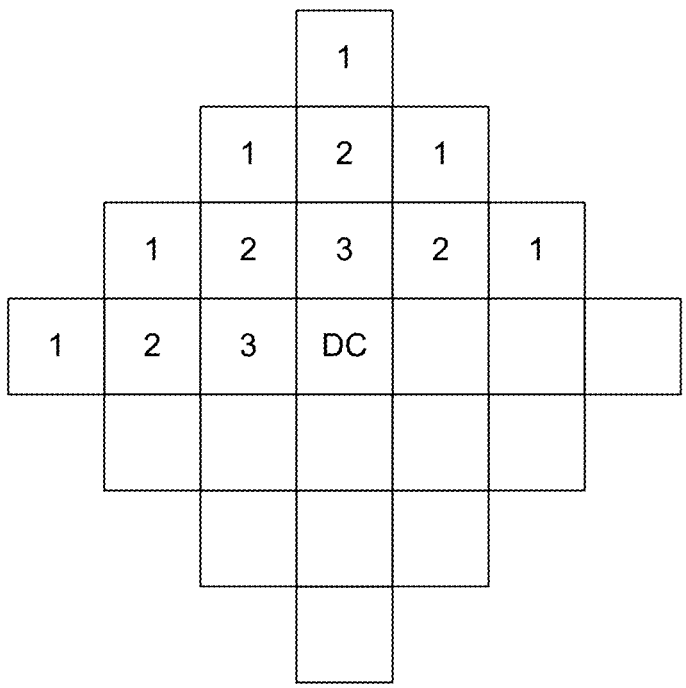
FIG. 3 is a conceptual diagram illustrating an example 7×7 filter shape with three categories for filter coefficient signaling.

Based on the distance between one position and the position of the DC filter coefficient, one filter support could be split into multiple categories. One example for a 7×7 diamond filter shape with 3 categories is depicted in FIG. 3. In other words, FIG. 3 illustrates an example 7×7 filter shape with three categories for filter coefficients signaling. Each square of FIG. 3 denotes one filter coefficient and squares containing the same number are coded with the same Golomb parameter.

The signaling of filter coefficients comprises, or in some examples consists of, two parts:

1) Golomb parameters: one value of Golomb parameter (denoted by kMin) is firstly signaled, followed by one-bit flag for each category. The one-bit flag indicates whether the parameter of category i (i from 1 to 3, inclusive, for 7×7 diamond symmetric filter support) is the same or increased by 1 compared to the Golomb parameter used for the previous category (i−1) when i is larger than 1; or compared to kMin when i is equal to 1.

2) Coefficients: based on the selected Golomb parameters, the absolute values of coefficients are coded followed by the sign flag. https://en.wikipedia.org/wiki/Golomb_coding describes details of Golomb coding.

The ALF coefficients of reference pictures are stored and may be reused as ALF coefficients of a current picture. A video coder (e.g., video encoder 20 and/or video decoder 30) may choose to use ALF coefficients stored for the reference pictures as the ALF coefficients used in the current picture, and may bypass the ALF coefficients signalling. In this case, video encoder 20 only signals an index to one of the reference pictures, and the stored ALF coefficients of the indicated reference picture are inherited for the current picture. To indicate the usage of temporal prediction, one flag is coded before sending the index.

M. Karczewicz et al., "Improvements on adaptive loop filter", Exploration Team (JVET) of ITU-T SG 16 WP 3 and ISO/IEC JTC 1/SC 29/WG 11, Doc. JVET-B0060_r1, 2nd Meeting: San Diego, USA, 20-26 Feb. 2016 (hereinafter JVET-B0060_r1) proposed a Geometric transformations-based ALF (GALF). In GALF, the classification is modified with the diagonal gradients taken into consideration and video coders may apply geometric transformations to filter coefficients. A video coder categorizes each 2×2 block into one of 25 classes based on a directionality and quantized value of activity of the block. Section 2.1 of JVET-B0060_r1 provides details. Section 2.1 of JVET-B0060_r1 is reproduced below.

Each 2×2 block is categorized into one out of 25 classes based on its directionality D and quantized value of activity $\hat{A}$:

$$C = 5D + \hat{A}. \quad (2)$$

Values of the horizontal, vertical and two diagonal gradients are calculated using 1-D Laplacian:

$$g_v = \sum_{k=i-2}^{i+3} \sum_{l=j-2}^{j+3} V_{k,l}, V_{k,l} \quad (3)$$
$$= |2R(k, l) - R(k, l-1) - R(k, l+1)|,$$

$$g_h = \sum_{k=i-2}^{i+3} \sum_{l=j-2}^{j+3} H_{k,l}, H_{k,l} \quad (4)$$
$$= |2R(k, l) - R(k-1, l) - R(k+1, l)|,$$

$$g_{d1} = \sum_{k=i-2}^{i+3} \sum_{l=j-3}^{j+3} D1_{k,l}, D1_{k,l} \quad (5)$$
$$= |2R(k, l) - R(k-1, l-1) - R(k+1, l+1)|$$

$$g_{d2} = \sum_{k=i-2}^{i+3} \sum_{j=j-2}^{j+3} D2_{k,l}, D2_{k,l} \quad (6)$$
$$= |2R(k, l) - R(k-1, l+1) - R(k+1, l-1)|$$

Indices i and j refer to the coordinates of the upper left pixel in the 2×2 block. To assign the directionality D, ratio of maximum and minimum of the horizontal and vertical gradients $$g_{h,v}^{max} = \max(g_h, g_v), g_{h,v}^{min} = \min(g_h, g_v), \quad (7)$$

and the ratio of maximum and minimum of two diagonal gradients $$g_{d0,d1}^{max} = \max(g_{d0}, g_{d1}), g_{d0,d1}^{min} = \min(g_{d0}, g_{d1}), \quad (8)$$

are compared against each other and with set of thresholds $t_1$ and $t_2$:

Step 1.

If both $g_{h,v}^{max} \leq t_1 \cdot g_{h,v}^{min}$ and $g_{d0,d1}^{max} \leq t_1 \cdot g_{d0,d1}^{min}$, D is set to 0.

Step 2.

If $g_{h,v}^{max}/g_{h,v}^{min} > g_{d0,d1}^{max}/g_{d0,d1}^{min}$ continue from Step 3, otherwise continue from Step 4.

Step 3.

If $g_{h,v}^{max} > t_2 \cdot g_{h,v}^{min}$, D is set to 2, otherwise D is set to 1.

Step 4.

If $g_{d0,d1}^{max} > t_2 \cdot g_{d0,d1}^{min}$, D is set to 4, otherwise D is set to 3.

The activity value A is calculated as:

$$A = \sum_{k=i-2}^{i+3} \sum_{l=j-2}^{j+3} (V_{k,l} + H_{k,l}). \tag{9}$$

A is further quantized to the range of 0 to 4 inclusively, and the quantized value is denoted as Â.

In addition, to improve coding efficiency when temporal prediction is not available (e.g., for intra frames), a set of 16 fixed filters is assigned to each class. To indicate the usage of the fixed filter, a flag for each class is signaled and if required, the index of the chosen fixed filter. Even when the fixed filter is selected for a given class, the coefficients of the adaptive filter f(k, l) can still be sent for this class in which case the coefficients of the filter which will be applied to the reconstructed image are a sum of both sets of coefficients. Number of classes can share the same coefficients f(k, l) signaled in the bitstream even if different fixed filters were chosen for them. In U.S. Provisional Patent Applications 62/295,461, filed Feb. 15, 2016, and 62/324,776, filed Apr. 19, 2016, the fixed filters could also be applied to inter-coded frames.

Filter coefficients may be signaled or determined in various ways. For example, a prediction pattern and prediction index of fixed filters may be determined for fixed filters. In this example, three cases of prediction patterns are defined: case 1: whether none of the filters of the 25 classes are predicted from the fixed filter; case 2: all filters of the classes are predicted from the fixed filter; and case 3: filters associated with some classes are predicted from fixed filters and filters associated with the rest of the classes are not predicted from the fixed filters. An index may be firstly coded to indicate one of the three cases. In addition, the following applies: If the prediction pattern is case 1, there is no need to further signal the index of fixed filter. Otherwise, if the prediction pattern is case 2, an index of the selected fixed filter for each class is signaled. Otherwise (the prediction pattern is case 3), one bit for each class is firstly signaled, and if fixed filter is used, the index is further signaled.

To reduce the number of bits required to represent the filter coefficients, different classes can be merged. However, unlike in JCTVC-E603, any set of classes can be merged, even classes having non-consecutive values of C. The information on which classes are merged is provided by sending for each of the 25 classes an index $i_C$. Classes having the same index $i_C$ share the same filter coefficients that are coded. The index $i_C$ is coded with a truncated fixed length method.

Similarly, the forceCoef0 flag is also used. When the forceCoef0 flag is equal to 1, a one-bit flag, denoted by CodedVarBin, for each of the merged groups (all filters to be coded) is further signaled to indicate whether the signaled filter coefficients are all zero. Moreover, when this flag is equal to 1, the predictive coding, i.e., coding the difference between current filter and previously coded filter, is disabled.

When prediction from fixed filters is allowed, the filters (e.g., filter parameters) to be signaled/coded mentioned above are the differences between the filter applied to the reconstructed image and the selected fixed filter. In the GALF proposal of WET-B0060_r1, other information, such as coefficients are coded in the same way as in JEM2.0.

Class Index Derivation:

The classification is still based on the 1D Laplacian direction and 2D Laplacian activity of each N×N luma block. However, the definitions of both direction and activity have been modified to better capture local characteristics. First, values of two diagonal gradients, in addition to the horizontal and vertical gradients used in the existing ALF, are calculated using 1-D Laplacian. As it can be seen from equation (7*) to (10*), below, the sum of gradients of all pixels within a 6×6 window that covers a target pixel is employed as the represented gradient of target pixel. According to experiments, the window size, i.e., 6×6, provides a good trade-off between complexity and coding performance. Each pixel is associated with four gradient values, with vertical gradient denoted by $g_v$, horizontal gradient denoted by $g_h$, 135-degree diagonal gradient denoted by $g_{d1}$ and 45 degree diagonal gradient denoted by $g_{d2}$.

$$g_v = \sum_{k=i-2}^{i+3} \sum_{l=j-2}^{j+3} V_{k,l}, \tag{7*}$$

$$V_{k,l} = |2R(k, l) - R(k, l-1) - R(k, l+1)|$$

$$g_h = \sum_{k=i-2}^{i+3} \sum_{l=j-2}^{j+3} H_{k,l}, \tag{8*}$$

$$H_{k,l} = |2R(k, l) - R(k-1, l) - R(k+1, l)|$$

$$g_{d1} = \sum_{k=i-2}^{i+3} \sum_{l=j-3}^{j+3} D1_{k,l}, \tag{9*}$$

$$D1_{k,l} = |2R(k, l) - R(k-1, l-1) - R(k+1, l+1)|$$

$$g_{d2} = \sum_{k=i-2}^{i+3} \sum_{j=j-2}^{j+3} D2_{k,l}, \tag{10*}$$

$$D2_{k,l} = |2R(k, l) - R(k-1, l+1) - R(k+1, l-1)|$$

Here, indices i and j refer to the coordinates of the upper left pixel in the 2×2 block.

To assign the directionality D, ratio of maximum and minimum of the horizontal and vertical gradients, denoted by $R_{h,v}$ in equation (11*), below, and the ratio of maximum and minimum of two diagonal gradients, denoted by $R_{d1,d2}$ in equation (12*), below, are compared against each other with two thresholds $t_1$ and $t_2$.

$$R_{h,v} = g_{h,v}^{max} / g_{h,v}^{min}$$

wherein $g_{h,v}^{max} = \max(g_h, g_v)$, $g_{h,v}^{min} = \min(g_h, g_v)$, (11*)

$$R_{d0,d1} = g_{d0,d1}^{max} / g_{d0,d1}^{min}$$

wherein $g_{d0,d1}^{max} = \max(g_{d0}, g_{d1})$, $g_{d0,d1}^{min} = \min(g_{d0}, g_{d1})$ (12*)

By comparing the detected ratios of horizontal/vertical and diagonal gradients, five direction modes, i.e., D within the range of [0, 4] inclusive, are defined in equation (13*), below. The values of D and its physical meaning are described in Table I.

$$D = \begin{cases} 0 & R_{h,v} \leq t_1 \,\&\&\, R_{d0,d1} \leq t_1 \\ 1 & R_{h,v} > t_1 \,\&\&\, R_{h,v} > R_{d0,d1} \,\&\&\, R_{h,v} > t_2 \\ 2 & R_{h,v} > t_1 \,\&\&\, R_{h,v} > R_{d0,d1} \,\&\&\, R_{h,v} \leq t_2 \\ 3 & R_{d0,d1} > t_1 \,\&\&\, R_{h,v} \leq R_{d0,d1} \,\&\&\, R_{d0,d1} > t_2 \\ 4 & R_{d0,d1} > t_1 \,\&\&\, R_{h,v} \leq R_{d0,d1} \,\&\&\, R_{d0,d1} \leq t_2 \end{cases} \quad (13^*)$$

TABLE I

VALUES OF DIRECTION AND ITS PHYSICAL MEANING

| Direction values | physical meaning |
|---|---|
| 0 | Texture |
| 1 | Strong horizontal/vertical |
| 2 | horizontal/vertical |
| 3 | strong diagonal |
| 4 | diagonal |

The activity value A is calculated as:

$$A = \sum_{k=i-2}^{i+3} \sum_{l=j-2}^{j+3} (V_{k,l} + H_{k,l}). \quad (14^*)$$

A is further quantized to the range of 0 to 4 inclusive, and the quantized value is denoted as $\hat{A}$.

Therefore, in the proposed GALF scheme, each N×N block is categorized into one of 25 classes based on its directionality D and quantized value of activity $\hat{A}$:

$$C = 5D + \hat{A}. \quad (15^*)$$

Current ALF and GALF designs may have the following issues: First, each block is assigned with one specific class index by quantizing the direction/activity values. Thus, blocks in the same class may still have some different characteristics due to the quantization. Such information is not used in the current ALF/GALF designs. Second, one block is assigned with only one filter, the assignment of which does not consider the neighboring information and limits the coding performance.

Techniques of this disclosure may address these shortcomings. The following itemized techniques may be applied individually. Alternatively, combinations of the itemized techniques may be applied. The following examples assume that ALF classification is based on an N×N block (wherein N is a positive value, e.g., 1, 2, 4).

For each N×N block to be filtered, a video coder (e.g., video encoder 20 and/or video decoder 30) applies multiple filters instead of just using one filter. Thus, after encoding a current picture of the video data, video encoder 20 may reconstruct the current picture. Furthermore, after reconstructing the current picture, video encoder 20 may apply a particular function of a plurality of filters to a current block of the current picture. The current block comprises reconstructed samples of the current picture. In some instances, video encoder 20 does not wait to fully reconstruct the current picture before filtering blocks of the current picture. Rather, video encoder 20 may start filtering blocks of the current picture while still reconstructing other parts of the current picture. Thus, video encoder 20 may reconstruct one or more blocks (e.g., M×N blocks) of the current picture, where the one or more reconstructed blocks include reconstructed samples of the current picture. Additionally, video encoder 20 may apply a particular function of a plurality of filters to a current block (e.g., a K×L block) that comprises the reconstructed samples. Similarly, video decoder 30 may reconstruct a current picture (or one or more blocks of the current picture). After reconstructing the current picture (or one or more blocks of the current picture), video decoder 30 may apply a particular function of a plurality of filters to a current block of the current picture.

In some examples, a video coder applies a confusion function of multiple filters, such as a linear function, to confuse these filters. Thus, after reconstructing one or more blocks of a current picture, a video coder (e.g., video encoder 20 or video decoder 30) may apply, to a current block of the current picture, a linear function of a plurality of filters. For instance, in one example, the filtering process of equation (1) is modified to:

$$\tilde{R}(i, j) = \frac{\sum_{m=0}^{M-1} w(m) * \left(\sum_{k=-K}^{K} \sum_{l=-K}^{K} f_m(k, l) R(i+k, j+l)\right)}{\left(\sum_{k=-K}^{K} \sum_{l=-K}^{K} f(k, l)\right) * \left(\sum_{m=0}^{M-1} w(m)\right)} \quad (7)$$

In equation (7), $\tilde{R}(i, j)$ indicates a filtered value of a sample at position (i, j) of a reconstructed picture, w(m) indicates the m-th weighting factor associated with an m-th block of a plurality of blocks, M indicates a total number of block in the plurality of blocks, $f_m$ indicates the filter used or derived for the m-th block based on the class/group index, K indicates ½ of the length or height of a matrix of coefficients for $f_m$, $f_m(k, l)$ is a quantized coefficient corresponding to a coefficient at location (k, l) of the matrix of coefficients for fin, and R(i+k, j+l) is a sample of a reconstructed picture at location (i+k, j+l). A video coder may derive the filter for the m-th block based on the class/group index according to the techniques used in ALF or GALF for deriving the class/group index as described elsewhere in this disclosure.

In some examples, the total number of filters used for filtering one N×N block (i.e., a current block) is equal to a number of neighboring blocks plus 1 (i.e., M in equation (7)), which may be the total number of blocks defined in a template. A template may be a geometrical pattern of blocks centered on a current block. In some examples, a template may have a diamond shape, similar to those of FIG. 2 and FIG. 3, but with the squares shown in FIG. 2 and FIG. 3 being N×N blocks instead of individual samples. In other examples, templates have different shapes, such as squares, rectangles, rhombuses, trapezoids, triangles, and so on. In some examples, the template is predefined, such that the template is available to video encoder 20 and video decoder 30 without signaling the template.

In some examples, a video coder may determine the number of filters included in the confusion function applied for a block. For instance, the total number of filters, denoted by $NUM_f$, for filtering one N×N block may be defined (e.g., pre-defined or signaled). $NUM_f$ may be smaller than the total number of blocks defined in a template. In the case where $NUM_f$ is smaller than the total number of blocks defined in the template, various rules may be used to select $NUM_f$ filters from the multiple filters ($f_m$ with m being 0 to M−1). For example, the first $NUM_f$ neighboring blocks in the template with the smallest group (class) indices compared to the current N×N block may be selected. The filters associated with the first $NUM_f$ neighboring blocks are used for the confusion.

In some examples, the multiple filters applied to a current block are defined as the selected filters for different classes/groups and the classes/groups are defined as those associated with the neighboring samples/blocks in a template. For example, for each respective block defined in a template, a video coder may identify a class/group index for the respective block. The video coder may identify the class/group index according to the examples provided elsewhere in this disclosure. Furthermore, in this example, the confusion function applied to the current block may include the filter corresponding to the class/group index for the respective block.

In some examples, the template is dependent on the slice types, quantization parameters, temporal identifier, or other information being referenced or not referenced by other pictures. In other words, a video coder may use different templates when applying a confusion function of multiple filters to a current block depending on a slice type of a slice containing the current block, depending on quantization parameters used during quantization for the current block, depending on a temporal identifier of a picture containing the current block, or depending on other factors. Example slice types include I-slices, P-slices, and B-slices. An I-slice may include intra predicted blocks, but not inter predicted blocks. A P-slice may include intra predicted block or uni-directionally inter predicted blocks, but not bi-directionally inter predicted blocks. A B-slice may include intra predicted blocks, uni-directionally inter predicted blocks, and bi-directionally inter predicted blocks. For example, a video coder may use templates defining different geometrical patterns depending on whether the current block is in an I-slice, P-slice, or B-slice. A temporal identifier (TID) may identify a NAL unit as belonging to a particular temporal sub-layer. For example, for sub-layers with lower TIDs, the template may contain more neighboring blocks/samples compared to those sub-layers with higher TIDs. That is because sub-layers with higher TIDs may be predicted from sub-layers with lower TIDs and sub-layers with lower TIDs may have already been filtered.

In some examples, the template is signaled in a sequence parameter header (e.g., a sequence parameter set), a picture parameter header (e.g., a picture parameter set), a slice header, or another type of syntax structure in a bitstream. In the context of HEVC, a sequence parameter header may be referred to as a sequence parameter set and a picture parameter header may be referred to as a picture parameter set. For example, video encoder 20 may include syntax elements in a sequence parameter header, a picture parameter header, a slice header, or another type of syntax structure in a bitstream. In this example, the syntax elements indicate the geometrical pattern defined by a template. Furthermore, in this example, video decoder 30 may obtain the syntax elements from the sequence parameter header, the picture parameter header, slice header, or other type of syntax structure in the data stream. In this example, video decoder 30 may use the obtained syntax elements to determine the template.

Figure 4:
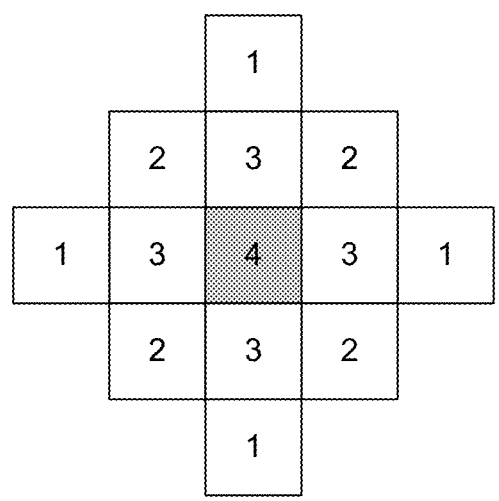
FIG. 4 is a conceptual diagram illustrating an example mask for weighting multiple filters, in accordance with a technique of this disclosure.
Figure 4:
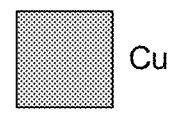

As noted above, the confusion function of multiple filters may apply weighting factors (e.g., w(m)) to results of the filters. In one example, the signaling of weighting factors employed by the confusion function is based on a pre-defined mask. The mask is an assignment of values to blocks in a geometrical pattern of blocks centered on a current block. For instance, a video coder may determine, based on a pre-defined mask, weighting factors used in a function of multiple filters. FIG. 4 is a conceptual diagram illustrating an example mask for weighting multiple filters, in accordance with a technique of this disclosure. In the example of FIG. 4, each square corresponds to an N×N block. In the example of FIG. 4, blocks containing the same values (i.e., "mask values") have the same weighting factor. In some examples, the weighting factors are not equal to the mask values. Taking the template shown in FIG. 4 as an example, those 'blocks' with the same mask values (from 1 to 4 in FIG. 4) indicate the same weighting factor and only one weighting factor is signaled. For instance, in the example of FIG. 4, a first weighting factor may be signaled for the mask value 1, a second weighting factor may be signaled for the mask value 2, a third weighting factor may be signaled for the mask value 3, and a fourth weighting factor may be signaled for the mask value 4. In this instance, the first, second, third, and fourth weight factors are only signaled once (as opposed to the first, second, and third weighting factors each being signaled four times).

Thus, in this example, video decoder 30 may obtain, from a bitstream, data indicating weighting factors for neighboring blocks. In this example, for each respective neighboring block of the neighboring blocks, the plurality of filters includes a respective filter for the respective neighboring block. Furthermore, in this example, video decoder 30 may use the weighting factors for the neighboring blocks when applying a particular function comprising multiple filters to a current block of a reconstructed picture.

In some examples, the weighting factors for the neighboring blocks are signaled while the weighting factor for the current block is skipped. In other words, video encoder 20 may indicate, in a bitstream, the weighting factors for the neighboring blocks without indicating in the bitstream the weighting factor for the current block. For instance, in the example of FIG. 4, video encoder 20 may signal the weighting factors for mask values 1, 2, and 3, but not the weighting factor for mask value 4. The weighting factor for a current block could be derived by the precision and signaled weighting factors for neighboring blocks. In one example, denote the precision by M, that is, the sum of all weighting factors is equal to (1<<M). The weighting factor for a current block could be derived as (1<<M) minus the summation of signaled weighting factors for neighboring blocks.

In some examples, differential coding of weighting factors may be applied. In other words, a video coder may use differential coding to determine weighting factors using in a function of a plurality of filters applied to a current block. For example, rather than directly signaling the values of a first, second, and third weighting factor, video encoder 20 may signal the value of a first weighting factor, signal the difference between the first weighting factor and a second weighting factor, and signal the difference between the second weighting factor and a third weighting factor. Differential coding of weighting factors may reduce the amount of data required to signal the weighting factors.

Furthermore, in one example, the order of indices (e.g., the mask values shown in FIG. 4) may further signaled. The order could be an increasing order/decreasing order. For example, a first weighting factor may be equal to 10, a second weighting factor may be equal to 7, and a third weighting factor equal to 2. In this example, it may be more efficient to signal the third weighting factor first, the second weighting factor, second, and the first weighting factor third. To illustrate why, consider that each of the weighting factors may be represented as a unary code. Hence, if the first weighting factor were signaled first, followed by the second weighting factor, followed by the third weighting factor, 10 1's would be signaled, followed by 3 1's, followed by 5 1's, for a total of 18 1's. In contrast, if the third weighting factor were signaled first, followed by the second weighting factor, followed by the first, there would be 2 1's, followed by 5 1's, followed by 5 1's, for a total of 12 1's. Hence, in this example, the order of indices may be signaled to use the second option instead of the first option.

In some examples, one bit may be signaled to indicate whether all weighting factors associated with the neighbors are equal to 0. If not, then the weighting factors are signaled, such as using fixed length coding. For example, video encoder 20 may signal, in a bitstream, a syntax element indicating whether weighting factors for all neighboring blocks in a template are equal to 0. If the syntax element indicates that not all weighting factors for the neighboring blocks in the template are equal to 0, video encoder 20 may signal, in the bitstream, weighting factors for one or more of the neighboring blocks in the template. Similarly, video decoder 30 may obtain, from a bitstream, a syntax element indicating whether weighting factors for all neighboring blocks in a template are equal to 0. In response to determining that the syntax element indicates that not all weighting factors for the neighboring blocks in the template are equal to 0, video decoder 30 may obtain, from the bitstream, data indicating weighting factors for one or more of the neighboring blocks of the template. In this example, video decoder 30 may use the weighting factors associated with the neighboring blocks to apply the particular function.

For one block, a unique group index or class index is assigned, such as based on the activity and direction matrix. Instead of applying one filter associated with the group index or class index to this block, multiple filters may be applied and the multiple filters are selected based on the results of a matrix for the current block. In one example, given the activity of a current block, $Act_b$ (or, after quantization, A as described elsewhere in this disclosure), the filters associated with consecutive values of $Act_b$, such as ($\hat{A}+1$) or ($\hat{A}-1$), are used to filter the current block. For example, a video coder (e.g., video encoder 20 or video decoder 30) may determine a quantized activity level $\hat{A}$ for a current block and a direction value $Dir_b$ for the current block. In this example, the video coder may determine a filtered value of a sample of the current block as an average (e.g., a weighted average) of sample values produced by applying a filter associated with $\hat{A}$ and $Dir_b$, a filter associated with ($\hat{A}+1$) and $Dir_b$, and a filter associated with ($\hat{A}-1$) and $Dir_b$. In this way, the video coder may determine, based on the activity level (e.g., $Act_b$ or $\hat{A}$) of a current block, two or more filters in the plurality of filters.

In some examples, given the activity of one block $Dir_b$ the filters associated with consecutive values of $Dir_b$, such as ($Dir_b+1$) or ($Dir_b-1$) could be used to filter current block. For example, a video coder (e.g., video encoder 20 or video decoder 30) may determine a quantized activity level $\hat{A}$ for a current block and a direction value $Dir_b$ for the current block. In this example, the video coder may determine a filtered value of a sample of the current block as an average (e.g., a weighted average) of sample values produced by applying a filter associated with $\hat{A}$ and $Dir_b$, a filter associated with $\hat{A}$ and ($Dir_b+1$), and a filter associated with $\hat{A}$ and ($Dir_b-1$).

In some examples, the two methods above are used together. For example, a video coder (e.g., video encoder 20 or video decoder 30) may determine a quantized activity level $\hat{A}$ for a current block and a direction value $Dir_b$ for the current block. In this example, the video coder may determine a filtered value of a sample of the current block as an average (e.g., a weighted average) of sample values produced by applying a filter associated with $\hat{A}$ and $Dir_b$, a filter associated with ($\hat{A}+1$) and $Dir_b$, a filter associated with ($\hat{A}-1$) and $Dir_b$, a filter associated with $\hat{A}$ and ($Dir_b+1$), and a filter associated with $\hat{A}$ and ($Dir_b-1$). In this way, the video coder may determine, based on at least one of an activity level (e.g., $\hat{A}$) of a current block or the direction value (e.g., $Dir_b$) of the current block, two or more filters in a plurality of filters used in the confusion function.

In some examples, a video coder may apply a particular function (i.e., the confusion function) of multiple filters using pre-defined weighting factors for selected filters of the plurality of filters. In some examples, the weighting factors for the selected filters are pre-defined or signaled in a sequence parameter header, a picture parameter header, or a slice header. Thus, a video coder may determine, based on syntax elements, weighting factors for selected filters of the plurality of filters, where the syntax elements are included in one or more of: a sequence parameter header, picture parameter header, or slice header and apply a particular function of multiple filters using the pre-defined weighting factors for the selected filters of the plurality of filters. In one example, the weighting factors are the same for all classes.

In some examples, the weighting factors are dependent on the group index, class index, and/or positions of the block relative to a coding unit/prediction unit/transform unit, and/or coding mode (e.g., intra prediction or inter prediction). For example, a video coder may use a first set of weighting factors if the current block spans a CU, PU, and TU boundary, may use a second, different set of weighting factors if the current block does not span a CU, PU, or TU boundary, may use a third set of weighting factors if the current block spans a PU boundary but not a CU boundary, and so on. In another example, a video coder may use a first set of weighting factors if the current block includes samples predicted using only intra prediction, a second set of weighting factors if the current block includes samples predicted using only inter prediction, and a third set of weighting factors if the current block includes some samples predicted using intra prediction and some samples predicted using inter prediction. Thus, in accordance with these examples, a video coder may determine, based on a group index, a class index, a position of the current block relative to a coding unit, prediction unit, transform unit, or coding mode, weighting factors for selected filters of a plurality of filters. In this example, the video coder may use the pre-defined weighting factors for selected filters of a plurality of filters to apply a particular function comprising the plurality of filters.

In some examples, the weighting factors are inherited when temporal prediction of ALF filters is enabled. For instance, a video coder may determine the weighting factors for use in filtering a current block from weighting factors used for filtering a block in a previously coded picture, e.g., a temporal reference picture. In some examples, one or more of the weighting factors are signaled even when temporal prediction of ALF filters is enabled.

In one example, multiple sets of weighting factors are stored and an index of the set may be signaled. For instance, video encoder 20 and video decoder 30 may store multiple sets of weighting factors. In this example, video encoder 20 may use a particular set of weighting factors with a current block and video encoder 20 may signal, in a bitstream, an index of the set of weighting factors. Furthermore, in this example, video decoder 30 may obtain, from the bitstream, the index of the set of weighting factors. Based on the index obtained from the bitstream, video decoder 30 may determine the set of weighting factors to use with the current block. The weighting factors may be applied to filters of neighboring blocks in a template, filters determined based on adjacent activity levels and/or direction values, and so on.

In one example, the total number of stored sets of weighting factors is less than a threshold, and the current derived weighting factors may be added to the sets of weighting factors. For example, video encoder 20 and video decoder 30 may store a particular number of weighting factor sets. Furthermore, in this example, video encoder 20 and video decoder 30 may independently derive a set of weighting factors not in the stored sets of weighting factors. In this example, if video encoder 20 selects the derived set of weighting factors, video encoder 20 may apply, to samples of a current block, a function of a plurality of filters, where the filters are weighted according to the derived set of weighting factors. Additionally, in this example, video encoder 20 may signal, in a bitstream, a syntax element indicating a special index value. The special index value corresponds to the derived set of weighting factors. In this example, video decoder 30 may obtain, from the bitstream, a syntax element indicating the special index value. Accordingly, in this example, video decoder 30 may apply, to samples of the current block, a function of a plurality of filters in which the filters are weighted according to the derived set of weighting factors.

Furthermore, in some examples, only when at least one or more of the derived weighting factors are different from one set of stored weighting factors, are the derived weighting factors added as a new set of weighting factors. Furthermore, in some examples, the differences of the derived weighting factors and the set of weighting factors may be coded instead of always reusing the weighting factors stored. For instance, a video coder may signal values indicating differences between a derived set of weighting factors and a stored set of weighting factors. In some examples, the video encoder or decoder may select one of the three methods: directly coding the weighting factors or the set index or the differential coding for signaling the weighting factors.

In accordance with a technique of this disclosure, instead of splitting one image or slice into multiple non-overlapped blocks and assigning one unique class index or group index for each block, the image or slice is split into overlapped blocks. In one example, each block is still assigned with one class index or group index. However, in this example, for pixels which are included in more than one block (e.g., pixels in more than one block), multiple filters may be applied to get the final filtered results. The filters are those signaled in the bitstream and associated with the class indices or group indices of the blocks covering one pixel.

In this way, video encoder 20 may reconstruct samples of a current picture of the video data. The current picture may include a first block and a second block, where the first and second blocks are partially overlapping. Furthermore, video encoder 20 may determine a class for the first block and a class for the second block. Video encoder 20 may determine the classes for the first block and the second block in accordance with techniques described elsewhere in this disclosure. In this example, video encoder 20 may apply to each reconstructed sample of the first block, a filter associated with the class for the first block. Additionally, in this example, video encoder 20 may apply to each reconstructed sample of the second block, a filter associated with the class for the second block, such that the filter associated with the class for the first block and the filter associated with the class for the second block are both applied to reconstructed samples in overlapping parts of the first and second blocks. Thus, video encoder 20 applies a function of multiple filters to a third block, which corresponds to the overlap between the first and second blocks. A similar example uses groups instead of classes.

Similarly, video decoder 30 may receive a bitstream comprising an encoded representation of a plurality of pictures of the video data. Additionally, in this example, video decoder 30 may reconstruct samples of a current picture of the plurality of pictures. The current picture includes a first block and a second block. In this example, the first and second blocks are partially overlapping. Furthermore, in this example, video decoder 30 may determine a class for the first block and a class for the second block. Video decoder 30 may determine the classes for the first block and the second block in accordance with techniques described elsewhere in this disclosure. In this example, video decoder 30 may apply to each reconstructed sample of the first block, a filter associated with the class for the first block. In this example, video decoder 30 may apply, to each reconstructed sample of the second block, a filter associated with the class for the second block, such that the filter associated with the class for the first block and the filter associated with the class for the second block are both applied to reconstructed samples in overlapping parts of the first and second blocks. Thus, video decoder 30 applies a function of multiple filters to a third block, which corresponds to the overlap between the first and second blocks. A similar example uses groups instead of classes.

Figure 5:
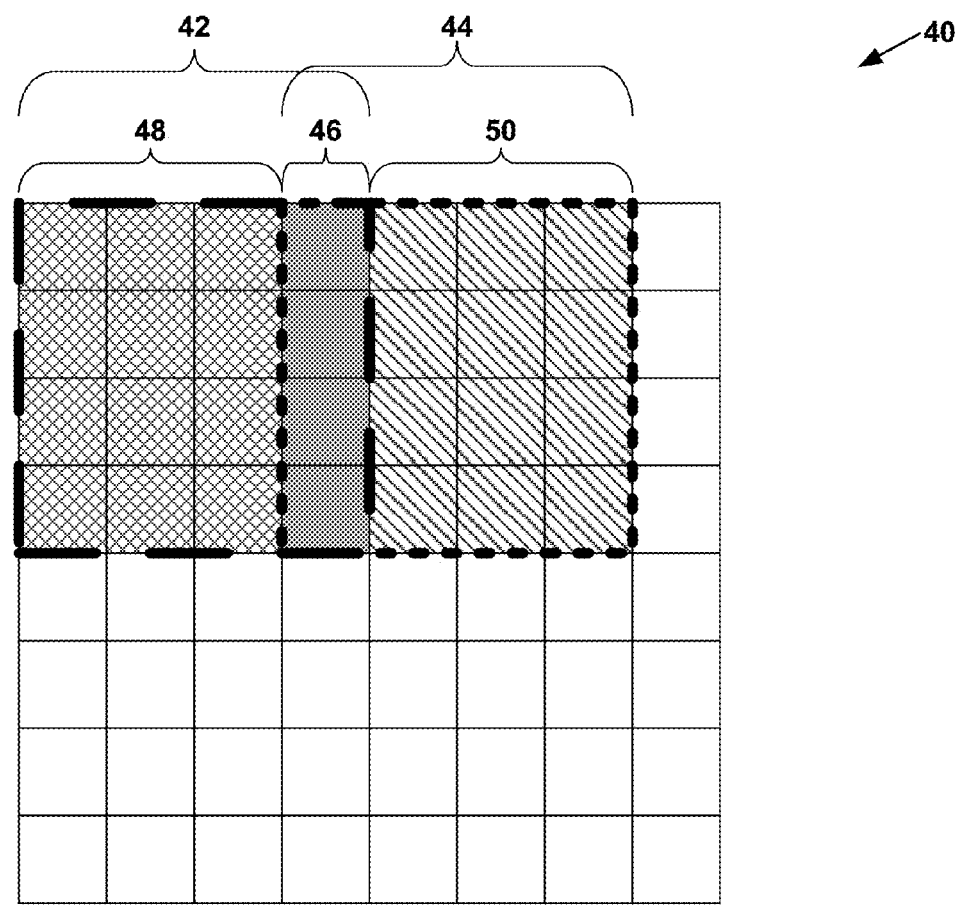
FIG. 5 is a block diagram illustrating an example picture that includes overlapping blocks, in accordance with a technique of this disclosure.

FIG. 5 is a block diagram illustrating an example picture that includes overlapping blocks, in accordance with a technique of this disclosure. In the example of FIG. 5, small squares correspond to samples. Furthermore, in the example of FIG. 5, a first block 42 and a second block 44 are outlined in long dashed lines and short dashed lines, respectively. In the example of FIG. 5, four samples 46 (shaded in gray for ease of understanding) are shared by blocks 42 and 44. Samples 46 may be considered a third block. Furthermore, a video coder (e.g., video encoder 20 or video decoder 30) may determine a first group index for block 42 and a second, separate group index for block 44. The video coder may apply a filter associated with the first group index for samples 48 that are only in block 42 and may apply a filter associated with the second group index for samples 50 that are only in block 44. The video coder may apply a confusion function to each of samples 46. The confusion function is a combination of the filter associated with the first group index and the filter associated with the second group index.

In some examples, more than one class index may be assigned to a current block. In such examples, each class index assigned to the current block may be associated with a certain filter. In some examples, multiple rules of classification may be defined. In this way, video encoder 20 may reconstruct samples of a current picture of the video data. In this example, video encoder 20 may assign a plurality of class indexes to a current block of the current picture. Each respective class index of the plurality of class indexes is associated with a respective filter in a plurality of filters. Furthermore, video encoder 20 may apply, to a reconstructed sample of the current block, the filters associated with the plurality of class indexes assigned to the current block. In this example, after applying the filters, video encoder 20 may use the current picture as a reference picture in encoding another picture of the video data. Similarly, video decoder 30 may reconstruct samples of a current picture of the video data. In this example, video decoder 30 may assign a plurality of class indexes to a current block of the current picture. Each respective class index of the plurality of class indexes is associated with a respective filter in a plurality of filters. In this example, video decoder 30 may apply, to a reconstructed sample of the current block, the filters associated with the plurality of class indexes assigned to the current block.

In one example, different window sizes (e.g., 6×6 window in equation (14*) and 3×3 window) may be used for class index calculation based on the reconstructed samples within a current block and its neighboring blocks if needed. For instance, a video coder, such as video encoder 20 or video decoder 30, may assign the plurality of class indexes to the current block based on a plurality of window sizes.

Figure 6:
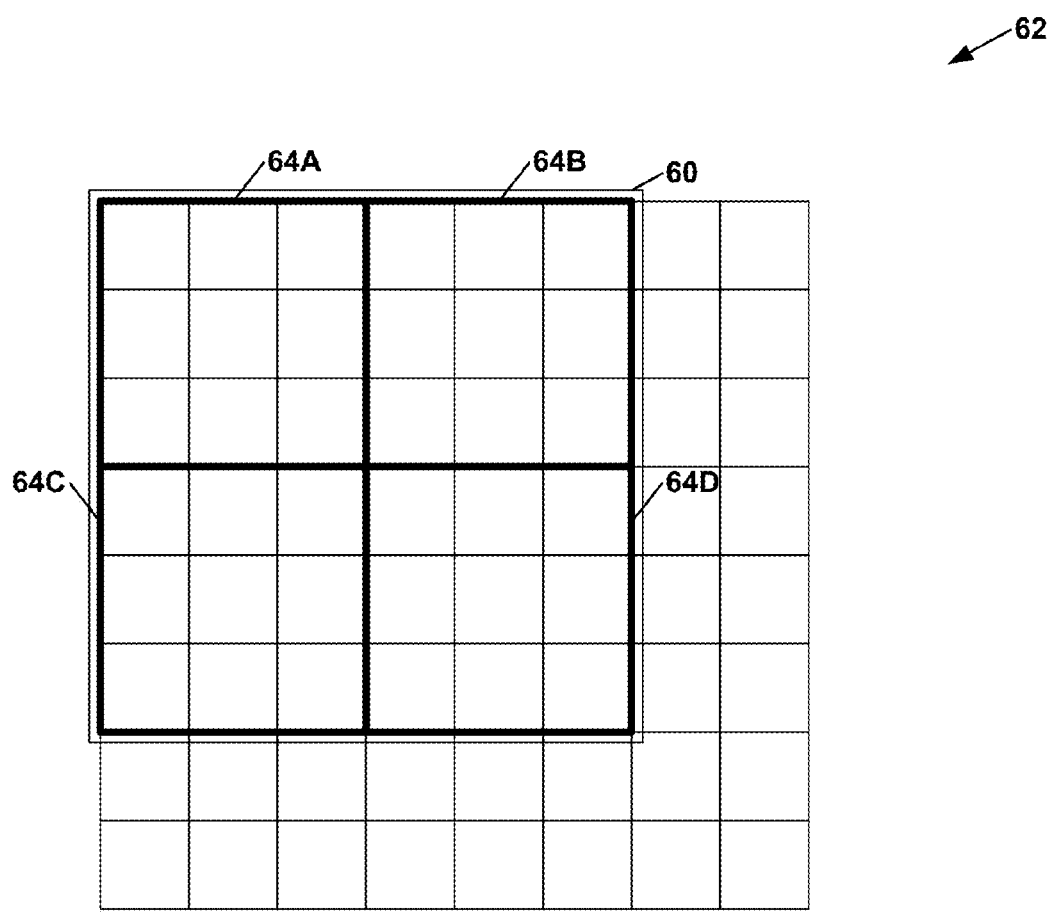
FIG. 6 is a block diagram illustrating a first example in which a block of a picture is assigned more than one class, in accordance with one or more techniques of this disclosure.

FIG. 6 is a block diagram illustrating an example in which a block 60 of a picture 62 is assigned more than one class, in accordance with one or more techniques of this disclosure. In the example of FIG. 6, block 60 is a 6×6 block. A video coder (e.g., a video encoder or a video decoder) may determine an activity level and a direction value for block 60 as a whole. The activity level and direction value for block 60 may correspond to a particular filter in a set of filters. In this way, the video coder may determine a filter based on the activity level and direction value of block 60. Additionally, block 60 comprises four 3×3 sub-blocks 64A, 64B, 64C, and 64D (collectively, "sub-blocks 64"). The video coder may separately determine activity levels and direction values for each of sub-blocks 64. For each respective sub-block of sub-blocks 64, the determined activity level and direction value for the sub-block corresponds to a respective filter. In this way, the video coder may determine a filter based on the activity level and direction value of the respective sub-block. Furthermore, for each respective sample of each respective sub-block of sub-blocks 64, the video coder may apply a confusion function (i.e., a function of multiple filters) to the respective sample. The confusion function applied to the respective sample is a combination of the filter determined based on the activity level and direction value of block 60 and the filter determined based on the activity level and direction value of the respective sub-block.

Figure 7:
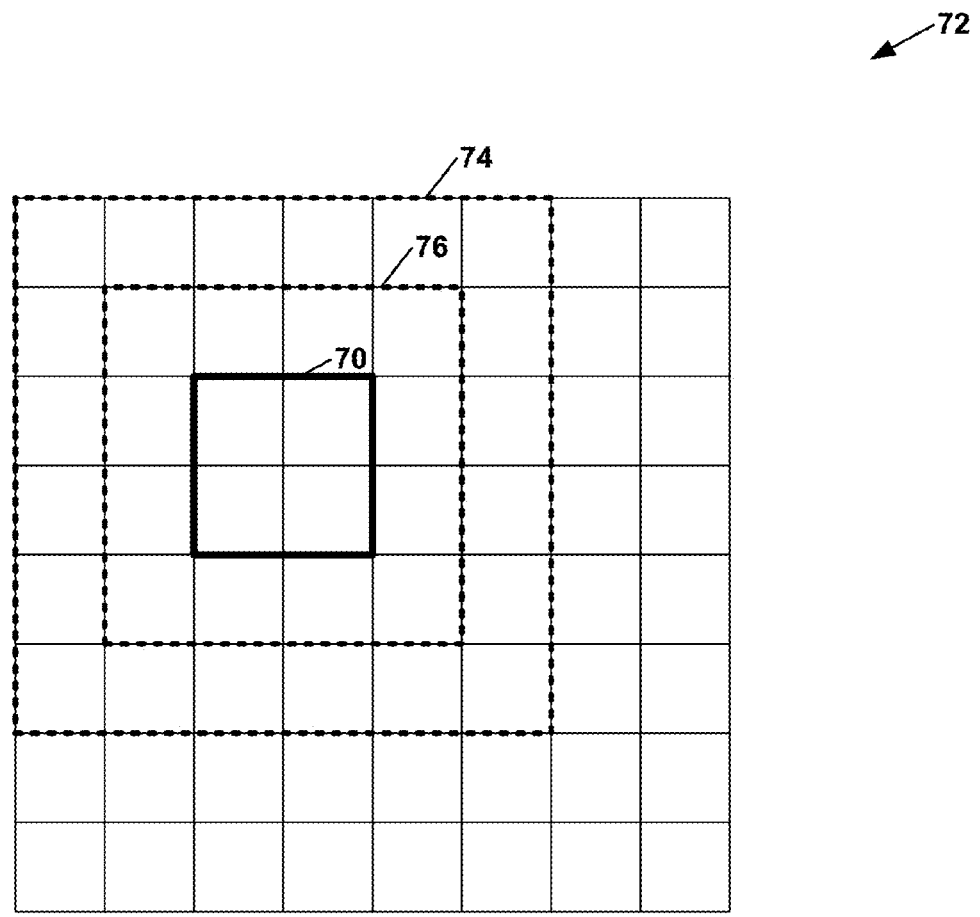
FIG. 7 is a block diagram illustrating a second example in which a block of a picture is assigned more than one class, in accordance with one or more techniques of this disclosure.

FIG. 7 is a block diagram illustrating a second example in which a block 70 of a picture 72 is assigned more than one class, in accordance with one or more techniques of this disclosure. In the example of FIG. 7, block 70 is a 2×2 block. A video coder (e.g., a video encoder or a video decoder) may determine an activity level and a direction value for block 70 based on the 6×6 block (block 74) covering block 70. The activity level and direction value for block 70 based on the 6×6 block may correspond to a particular filter in a set of filters. In this way, the video coder may determine a first filter based on the activity level and direction value of block 70. Additionally, the video coder may determine activity levels and direction values for block 70 based on a 4×4 block covering the block 70 (block 76). In this way, the video coder may determine a second filter based on the activity level and direction value based on block 76. Furthermore, for each respective sample of block 70, the video coder may apply a confusion function (i.e., a function of multiple filters) to the respective sample. The confusion function applied to the respective sample is a combination of the filter determined based on the activity level and direction value of block 74 and the filter determined based on the activity level and direction value of the block 76 that contains the respective sample. The video coder may repeat this for each 2×2 block of the picture.

In some examples, one class index for a current block may be inherited from a neighboring block and the other class index may be derived based on the reconstructed samples within the current block and its neighboring blocks if needed. For instance, a video coder may use the class index of a neighboring block (e.g., a spatially neighboring block or a temporally neighboring block) as a first class index of a current block and may calculate a second class index for the current block according to one of the class index derivation techniques described elsewhere in this disclosure (e.g., using equations (7)-(15). Thus, in such examples, as part of assigning a plurality of class indexes to a current block, a video coder may inherit a first class index of the plurality of class indexes from a block that neighbors the current block. Additionally, the video decoder may derive a second class index of the plurality of class indexes based on reconstructed samples within the current block.

Furthermore, in some examples, filters associated with multiple derived class indices may be used jointly to filter the block. For example, the confusion function described elsewhere in this disclosure (e.g., in equation (7)) may be further applied. In these examples, as part of applying the filters associated with the plurality of class indexes, a video coder may apply, to the current block, a particular function of the filters associated with the plurality of class indexes assigned to the current block.

In HEVC and other video coding standards, a video encoder may signal, for each slice, a flag to indicate whether ALF is enabled for the slice. This disclosure may refer to this flag as a slice-level ALF control flag. If ALF is enabled for the slice, the video encoder may signal another flag to indicate whether or not some quad-tree split blocks do not use ALF and others use ALF. This disclosure may refer to this flag as a block-level ALF control flag. If the block-level ALF control flag is on (i.e., some blocks within a quad-tree of an LCU use ALF and other blocks in the quad-tree of the same LCU do not use ALF), the video encoder further signals a depth value of the quad-tree for signaling flags for enabling/disabling ALF. The corresponding size is named as 'ALF control size'. For example, if an LCU is 128×128, depth value 0 indicates 128×128; depth value 1 indicates 64×64; depth value 2 indicates 32×32, and so on. For the quad-tree split, if a CU is larger or equal to the ALF control size, the video encoder signals a flag for enabling/disabling ALF in the CU. Otherwise, if the CU is smaller than the ALF control size, several neighboring CUs are merged to share one signaled flag for enabling/disabling ALF in the CUs.

In some examples, instead of signaling a flag for enabling/disabling ALF according to the depth of quad-tree, it is proposed to further consider the depth of other tree types supported in a coded slice. In one example, the other tree types may include one of binary trees, symmetric center-side triple trees, asymmetric trees, and other types of tree structures. In a binary tree, a block is partitioned vertically or horizontally into two equal-sized sub-blocks, each of which may be partitioned in the same manner recursively. In a symmetric center-side triple tree, a block is partitioned horizontally or vertically into three sub-blocks with the outer sub-blocks equal in size, the sub-blocks may be partitioned in the same manner recursively. In an asymmetric tree, a block is partitioned into two or more sub-blocks of unequal size, which may be further partitioned in the same manner recursively.

In this way, video encoder 20 may include, in a bitstream that comprises an encoded representation of a current picture of the video data, a syntax element (e.g., a flag for enabling/disabling ALF) indicating whether an ALF is enabled or disabled. In this example, the syntax element is signaled according to a depth of a type of tree other than a quad-tree. Furthermore, in this example, video encoder 20 may reconstruct samples of the current picture of the video data. In this example, in response to determining based on the syntax element that the ALF is enabled, video encoder 20 may apply the ALF to a reconstructed sample of the current picture. After applying the filters, video encoder 20 may use the current picture as a reference picture in encoding another picture of the video data.

Similarly, video decoder 30 may obtain, from a bitstream that comprises an encoded representation of a current picture of video data, a syntax element indicating whether an ALF is enabled or disabled. In this example, the syntax element is signaled according to a depth of a type of tree other than a quad-tree. Additionally, in this example, video decoder 30 may reconstruct samples of the current picture of the video data. In this example, in response to determining based on the syntax element that the ALF is enabled, video decoder 30 may apply the ALF to a reconstructed sample of the current picture.

In some examples, the control of enabling/disabling ALF may further consider the coded information (e.g., merge/AMVP mode, coded block flag (cbf), block sizes, etc.) if a condition is satisfied, (e.g., cbf is equal to 0), there is no need to signal the enabling/disabling flag. For example, video encoder 20 may not signal the ALF enabling/disabling flag for a block when the block is coded using merge mode but may signal the ALF enabling/disabling flag for the block when the block is coded using AMVP mode. In another example, video encoder 20 may signal the ALF enabling/disabling flag for a block when a size of the block is greater than or equal to a particular threshold (e.g., 8×8, 16×16, etc.), but does not signal the enabling/disabling flag for the block when the size of the block is less than the particular threshold.

In this way, video encoder 20 may determine, based on coded information, whether to include in a bitstream a syntax element indicating whether an ALF is enabled or disabled. Furthermore, in this example, video encoder 20 may reconstruct samples of a current picture of the video data. In this example, in response to determining that the ALF is enabled, video encoder 20 may apply the ALF to a reconstructed sample of the current picture. After applying the filters, video encoder 20 may use the current picture as a reference picture in encoding another picture of the video data. Similarly, video decoder 30 may determine, based on coded information, whether a bitstream includes a syntax element indicating whether an ALF is enabled or disabled. Additionally, in this example, video decoder 30 may reconstruct samples of a current picture of the video data. In this example, in response to determining that the ALF is enabled, video decoder 30 may apply the ALF to a reconstructed sample of the current picture. Applying the ALF may comprise applying a function of multiple filters to a block of a reconstructed picture. In these examples, the coded information may include at least one of: a merge/advanced motion vector prediction (AMVP) mode, a coded block flag (CBF), or a block size a video coder (e.g., video encoder 20 or video decoder 30). Furthermore, in some examples, the video coder may determine, based on the syntax element, whether the ALF is enabled. In some examples, the video coder may determine, based on the coded information, whether the ALF is enabled.

In some examples, the filtering process is implemented with shift, multiplication and sum operations, without division operations. For instance, denote the bit-depth of filters by $BD_F$, bit-depth of weighting factors by $BD_w$, bit-depth of reconstructed samples by $BD_S$. Assume the target internal bit-depth defined by MaxBD. The following methods may be applied to perform the filtering process:

The weighting factor is applied to each internal sample with one of the selected filter applied to current pixel. An internal sample indicates a value of applying the m-th filter, that is, $(\Sigma_{K=-K}^{K}\Sigma_{l=-K}^{K}f_m(k,l)R(i+k,j+l))$. Rounding or rounding with offset is only invoked once at the end of filtering process. In this example, equation (7) may be rewritten as:

$$\tilde{R}(i,j)=\Sigma_{m=0}^{M-1}w(m)*(\Sigma_{K=-K}^{K}\Sigma_{l=-K}^{K}f_m(k,l)R(i+k,j+l)) \qquad (8)$$

$$\tilde{R}(i,j)=(\tilde{R}(i,j)+\text{offset})>>(BD_F-1+BD_w) \qquad (9)$$

In one example, offset is set equal to $(1<<(BD_F-2+BD_w))$. In some implementations, this example is only enabled when $(BD_F+BD_w+BD_S)$ is not larger than MaxBD.

In some examples, an internal filter is derived based on all the weighting factors and the selected multiple filters. The internal filter is then applied to the current pixel to derive the final reconstructed pixel. Rounding or rounding with offset may be invoked twice. In one example, the rounding with/without offset is invoked when deriving an internal filter with weighting the selected multiple filters. Another rounding with/without offset is invoked at the end of filtering process. In this example, equation (7) may be rewritten as:

$$CF(k, l) = \sum_{m=0}^{M-1} (w(m)*f_m(k, l)) \qquad (10)$$

$$CF(k, l) = (CF(k, l) + O_0) >> (S_0) \qquad (11)$$

$$\tilde{R}(i, j) = \left(\sum_{k=-K}^{K}\sum_{l=-K}^{K} CF(k, l)*R(i+k, j+l)\right) \qquad (12)$$

$$\tilde{R}(i, j) = (\tilde{R}(i, j) + O_1) >> (S_1) \qquad (13)$$

In one example, $S_0$ is defined as $(BD_F+BD_w+BD_S-\text{MaxBD})$ and $S_1$ is defined as $(BD_F-1)$. In one example, $O_0$ is set equal to $(S_0>>1)$ and $O_1$ is set equal to $(S_1>>1)$. In some examples, this example is only enabled when $(BD_F+BD_w+BD_S)$ is larger than MaxBD.

Figure 8:
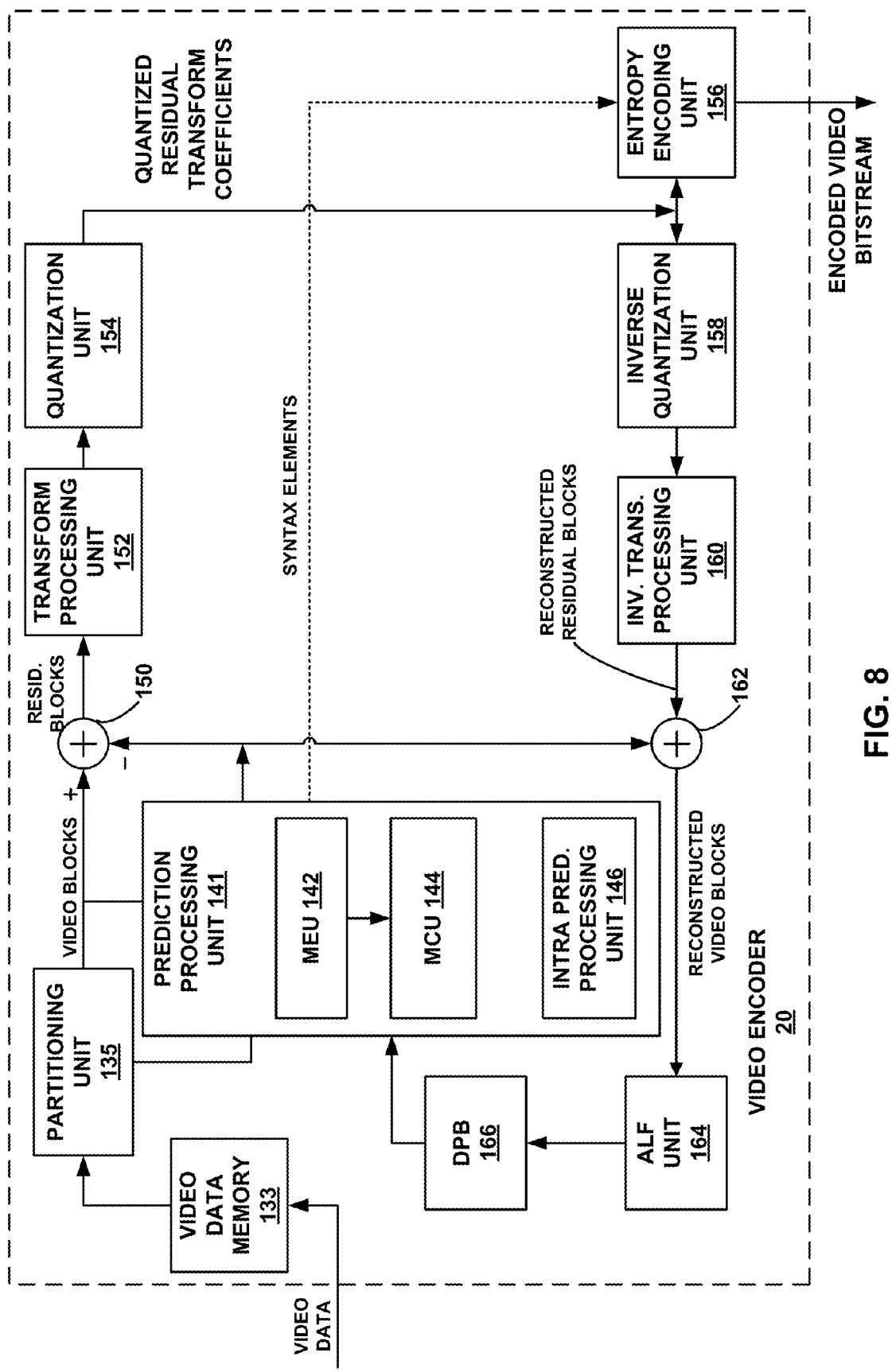
FIG. 8 is a block diagram illustrating an example video encoder that may implement one or more techniques described in this disclosure.

FIG. 8 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 8, video encoder 20 includes a video data memory 133, partitioning unit 135, prediction processing unit 141, summer 150, transform processing unit 152, quantization unit 154, entropy encoding unit 156. Prediction processing unit 141 includes motion estimation unit (MEU) 142, motion compensation unit (MCU) 144, and intra prediction unit 146. For video block reconstruction, video encoder 20 also includes inverse quantization unit 158, inverse transform processing unit 160, summer 162, ALF unit 164, and decoded picture buffer (DPB) 166.

As shown in FIG. 8, video encoder 20 receives video data and stores the received video data in video data memory 133. Video data memory 133 may store video data to be encoded by the components of video encoder 20. The video data stored in video data memory 133 may be obtained, for example, from video source 18. DPB 166 may be a reference picture memory that stores reference video data for use in encoding video data by video encoder 20, e.g., in intra- or inter-coding modes. Video data memory 133 and DPB 166 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 133 and DPB 166 may be provided by the same memory device or separate memory devices. In various examples, video data memory 133 may be on-chip with other components of video encoder 20, or off-chip relative to those components.

Partitioning unit 135 retrieves the video data from video data memory 133 and partitions the video data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 141 may select one of a plurality of possible coding modes, such as one of a plurality of intra coding modes or one of a plurality of inter coding modes, for the current video block based on error results (e.g., coding rate and the level of distortion). Prediction processing unit 141 may provide the resulting intra- or inter-coded block to summer 150 to generate residual block data and to summer 162 to reconstruct the encoded block for use as a reference picture.

Intra prediction unit 146 within prediction processing unit 141 may perform intra-predictive coding of the current video block relative to one or more neighboring blocks in the same frame or slice as the current block to be coded to provide spatial compression. Motion estimation unit 142 and motion compensation unit 144 within prediction processing unit 141 perform inter-predictive coding of the current video block relative to one or more predictive blocks in one or more reference pictures to provide temporal compression.

Motion estimation unit 142 may be configured to determine the inter-prediction mode for a video slice according to a predetermined pattern for a video sequence. The predetermined pattern may designate video slices in the sequence as P slices or B slices. Motion estimation unit 142 and motion compensation unit 144 may be highly integrated, but are illustrated separately for conceptual purposes. Motion estimation, performed by motion estimation unit 142, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in DPB 166. For example, video encoder 20 may interpolate values of one-quarter pixel positions, one-eighth pixel positions, or other fractional pixel positions of the reference picture. Therefore, motion estimation unit 142 may perform a motion search relative to the full pixel positions and fractional pixel positions and output a motion vector with fractional pixel precision.

Motion estimation unit 142 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in DPB 166. Motion estimation unit 142 sends the calculated motion vector to entropy encoding unit 156 and motion compensation unit 144.

Motion compensation, performed by motion compensation unit 144, may involve fetching or generating the predictive block based on the motion vector determined by motion estimation, possibly performing interpolations to sub-pixel precision. Upon receiving the motion vector for the PU of the current video block, motion compensation unit 144 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 150 represents the component or components that perform this subtraction operation. Motion compensation unit 144 may also generate syntax elements associated with the video blocks and the video slice for use by video decoder 30 in decoding the video blocks of the video slice.

After prediction processing unit 141 generates the predictive block for the current video block, either via intra prediction or inter prediction, video encoder 20 forms a residual video block by subtracting the predictive block from the current video block. The residual video data in the residual block may be included in one or more TUs and applied to transform processing unit 152. Transform processing unit 152 transforms the residual video data into residual transform coefficients using a transform, such as a discrete cosine transform (DCT) or a conceptually similar transform. Transform processing unit 152 may convert the residual video data from a pixel domain to a transform domain, such as a frequency domain.

Transform processing unit 152 may send the resulting transform coefficients to quantization unit 154. Quantization unit 154 quantizes the transform coefficients to further reduce bit rate. The quantization process may reduce the bit depth associated with some or all of the coefficients. The degree of quantization may be modified by adjusting a quantization parameter. In some examples, quantization unit 154 may then perform a scan of the matrix including the quantized transform coefficients. Alternatively, entropy encoding unit 156 may perform the scan.

Following quantization, entropy encoding unit 156 entropy encodes the quantized transform coefficients. For example, entropy encoding unit 156 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 156, the encoded bitstream may be transmitted to video decoder 30, or archived for later transmission or retrieval by video decoder 30. Entropy encoding unit 156 may also entropy encode the motion vectors and the other syntax elements for the current video slice being coded.

Inverse quantization unit 158 and inverse transform processing unit 160 apply inverse quantization and inverse transformation, respectively, to reconstruct the residual block in the pixel domain for later use as a reference block of a reference picture. Motion compensation unit 144 may calculate a reference block by adding the residual block to a predictive block of one of the reference pictures within one of the reference picture lists. Motion compensation unit 144 may also apply one or more interpolation filters to the reconstructed residual block to calculate sub-integer pixel values for use in motion estimation. Summer 162 adds the reconstructed residual block to the motion compensated prediction block produced by motion compensation unit 144 to produce a reconstructed block. In other words, summer 162 adds samples of the reconstructed residual block to corresponding samples of the motion compensated prediction block to reconstruct samples of a reconstructed block.

ALF unit 164 filters the reconstructed block (e.g. the output of summer 162) and stores the filtered reconstructed block in DPB 166 for uses as a reference block. The reference block may be used by motion estimation unit 142 and motion compensation unit 144 as a reference block to inter-predict a block in a subsequent video frame or picture. Although not explicitly shown in FIG. 8, video encoder 20 may include additional filters such as of a deblock filter, a sample adaptive offset (SAO) filter, or other type of loop filter. A deblock filter may, for example, apply deblocking filtering to filter block boundaries to remove blockiness artifacts from reconstructed video. An SAO filter may apply offsets to reconstructed pixel values in order to improve overall coding quality. In some implementations, SAO may be a special case or special mode of ALF filtering. Additional loop filters (in loop or post loop) may also be used.

ALF unit 164, alone or in conjunction with other components of video encoder 20, may be configured to perform the various techniques described in this disclosure including the techniques described in the claims section as well as elsewhere. For example, video encoder 20 may reconstruct samples of a current picture of the video data, as described elsewhere in this disclosure. Furthermore, ALF unit 164 may apply, to a current block of the current picture, a particular function of the plurality of filters. The current block comprises reconstructed samples of the current picture. Applying the particular function to the current block may comprise applying the particular function to each reconstructed sample of the current block. In some examples, ALF unit 164 assigns a plurality of class indexes to a current block of the current picture, each respective class index of the plurality of class indexes associated with a respective filter in a plurality of filters. Additionally, as part of applying the particular function to the current block, ALF unit 164 may apply, to a reconstructed sample of the current block, the filters associated with the plurality of class indexes assigned to the current block. After applying the filters, prediction processing unit 141 may use the current picture as a reference picture in encoding another picture of the video data.

In some examples, video encoder 20 may include, in a bitstream that comprises an encoded representation of a current picture of the video data, a syntax element indicating whether an ALF is enabled or disabled, wherein the syntax element is signaled according to a depth of a type of tree other than a quad-tree. The ALF may be a function of multiple filters. In this example, video encoder 20 may reconstruct samples of the current picture of the video data, as described elsewhere in this disclosure. Furthermore, in response to determining (e.g., based on the syntax element) that the ALF is enabled, ALF unit 164 may apply the ALF to a reconstructed sample of the current picture. After applying the filters, prediction processing unit 141 may use the current picture as a reference picture in encoding another picture of the video data.

In some examples, video encoder 20 may determine, based on coded information, whether to include in a bitstream a syntax element indicating whether an ALF is enabled or disabled. Video encoder 20 may reconstruct samples of a current picture of the video data, as described elsewhere in this disclosure. In response to determining that the ALF is enabled, ALF unit 164 may apply the ALF to a reconstructed sample of the current picture. After applying the filters, prediction processing unit 141 may use the current picture as a reference picture in encoding another picture of the video data.

Figure 9:
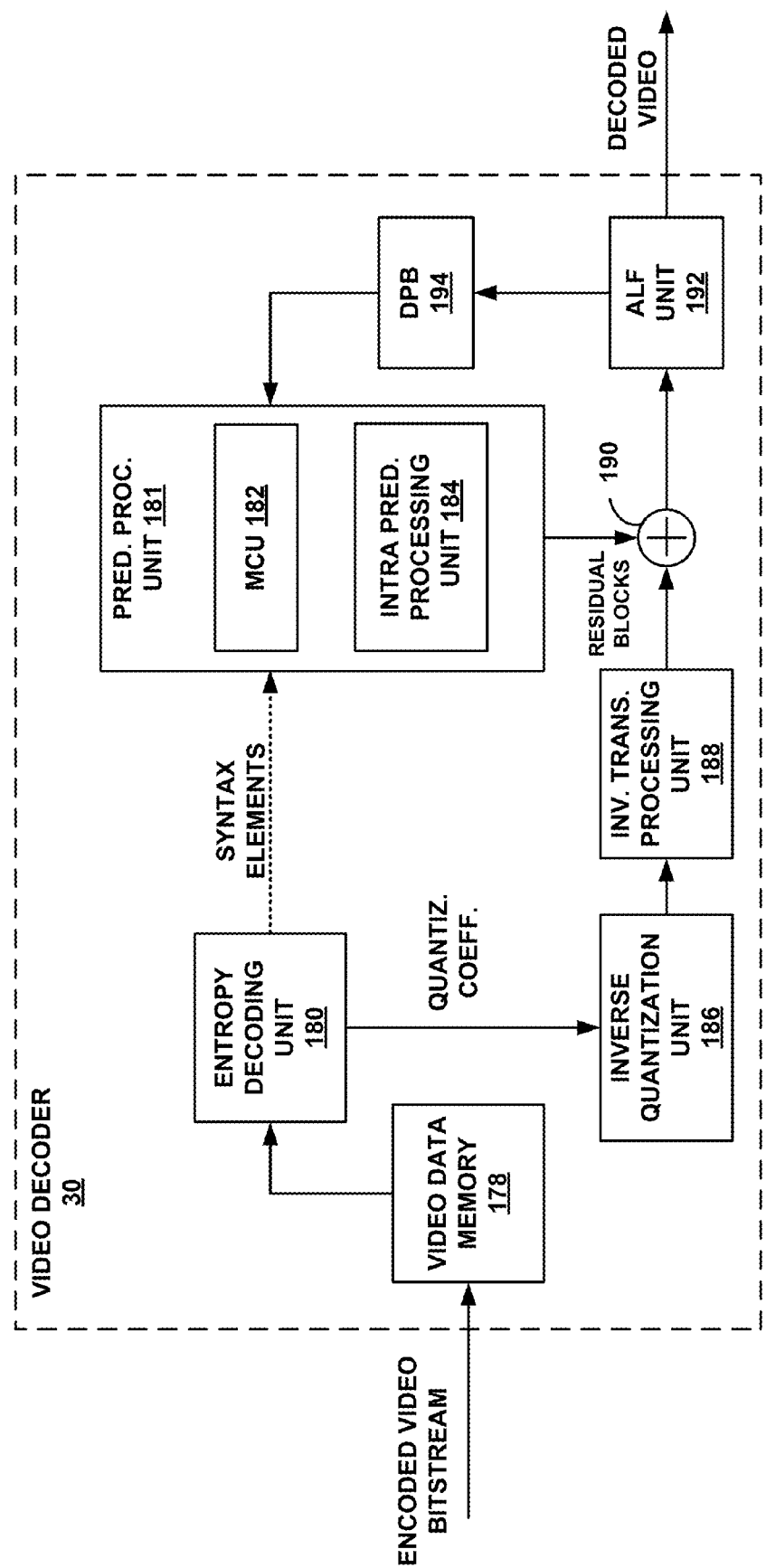
FIG. 9 is a block diagram illustrating an example video decoder that may implement one or more techniques described in this disclosure.

FIG. 9 is a block diagram illustrating an example video decoder 30 that may implement the techniques described in this disclosure. In the example of FIG. 9, video decoder 30 includes video data memory 178, entropy decoding unit 180, prediction processing unit 181, inverse quantization unit 186, inverse transform processing unit 188, summer 190, and DPB 194. Prediction processing unit 181 includes motion compensation unit 182 and intra prediction unit 184. Video decoder 30 may, in some examples, perform a decoding pass generally reciprocal to the encoding pass described with respect to video encoder 20 from FIG. 8.

During the decoding process, video decoder 30 receives an encoded video bitstream that represents video blocks of an encoded video slice and associated syntax elements from video encoder 20. Video decoder 30 stores the received encoded video bitstream in video data memory 178. Video data memory 178 may store video data, such as an encoded video bitstream, to be decoded by the components of video decoder 30. The video data stored in video data memory 178 may be obtained, for example, via link 16, from storage media 28, or from a local video source, such as a camera, or by accessing physical data storage media. Video data memory 178 may form a coded picture buffer (CPB) that stores encoded video data from an encoded video bitstream. DPB 194 may be a reference picture memory that stores reference video data for use in decoding video data by video decoder 30, e.g., in intra- or inter-coding modes. Video data memory 178 and DPB 194 may be formed by any of a variety of memory devices, such as DRAM, SDRAM, MRAM, RRAM, or other types of memory devices. Video data memory 178 and DPB 194 may be provided by the same memory device or separate memory devices. In various examples, video data memory 178 may be on-chip with other components of video decoder 30, or off-chip relative to those components.

Entropy decoding unit 180 of video decoder 30 entropy decodes the video data stored in video data memory 178 to generate quantized coefficients, motion vectors, and other syntax elements. Entropy decoding unit 180 forwards the motion vectors and other syntax elements to prediction processing unit 181. Video decoder 30 may receive the syntax elements at the video slice level and/or the video block level.

When the video slice is coded as an intra-coded (I) slice, intra prediction unit 184 of prediction processing unit 181 may generate prediction data for a video block of the current video slice based on a signaled intra prediction mode and data from previously decoded blocks of the current frame or picture. When the video frame is coded as an inter-coded slice (e.g., B slice or P slice), motion compensation unit 182 of prediction processing unit 181 produces predictive blocks for a video block of the current video slice based on the motion vectors and other syntax elements received from entropy decoding unit 180. The predictive blocks may be produced from one of the reference pictures within one of the reference picture lists. Video decoder 30 may construct the reference frame lists, List 0 and List 1, using default construction techniques based on reference pictures stored in DPB 194.

Motion compensation unit 182 determines prediction information for a video block of the current video slice by parsing the motion vectors and other syntax elements, and uses the prediction information to produce the predictive blocks for the current video block being decoded. For example, motion compensation unit 182 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 182 may also perform interpolation based on interpolation filters. Motion compensation unit 182 may use interpolation filters as used by video encoder 20 during encoding of the video blocks to calculate interpolated values for sub-integer pixels of reference blocks. In this case, motion compensation unit 182 may determine the interpolation filters used by video encoder 20 from the received syntax elements and use the interpolation filters to produce predictive blocks.

Inverse quantization unit 186 inverse quantizes, i.e., de-quantizes, the quantized transform coefficients provided in the bitstream and decoded by entropy decoding unit 180. The inverse quantization process may include use of a quantization parameter calculated by video encoder 20 for each video block in the video slice to determine a degree of quantization and, likewise, a degree of inverse quantization that should be applied. Inverse transform processing unit 188 applies an inverse transform, e.g., an inverse DCT, an inverse integer transform, or a conceptually similar inverse transform process, to the transform coefficients in order to produce residual blocks in the pixel domain.

After prediction processing unit 181 generates the predictive block for the current video block using, for example, intra or inter prediction, video decoder 30 may form a reconstructed video block by summing the residual blocks from inverse transform processing unit 188 with the corresponding predictive blocks generated by motion compensation unit 182. In other words, video decoder 30 may add samples of the residual blocks to corresponding samples of the predictive blocks to reconstruct samples of a video block of the picture. Summer 190 represents the component or components that perform this summation operation. ALF unit 192 filters the reconstructed video block using, for example, one or more of the ALF techniques described in this disclosure.

Although not explicitly shown in FIG. 9, video decoder 30 may also include one or more of a deblocking filter, an SAO filter, or other types of filters. Other loop filters (either in the coding loop or after the coding loop) may also be used to smooth pixel transitions or otherwise improve the video quality. The decoded video blocks in a given frame or picture are then stored in DPB 194, which stores reference pictures used for subsequent motion compensation. DPB 194 may be part of or separate from additional memory that stores decoded video for later presentation on a display device, such as display device 32 of FIG. 1.

ALF unit 192, alone or in conjunction with other components of video decoder 30, may be configured to perform the various techniques described in this disclosure including the techniques described in the claims section as well as elsewhere.

For example, video decoder 30 may reconstruct samples of a current picture of the video data, as described elsewhere in this disclosure. Furthermore, in this example, after reconstructing samples of the current picture, video decoder 30 may apply a particular function of a plurality of filters to a current block of the current picture. For instance, ALF unit 192 may assign a plurality of class indexes to a current block of the current picture, each respective class index of the plurality of class indexes associated with a respective filter in the plurality of filters. Additionally, in this example, ALF unit 192 may apply, to a reconstructed sample of the current block, the filters associated with the plurality of class indexes assigned to the current block.

In some examples, video decoder 30 may obtain, from a bitstream that comprises an encoded representation of a current picture of the video data, a syntax element indicating whether an ALF is enabled or disabled, wherein the syntax element is signaled according to a depth of a type of tree other than a quad-tree. The ALF may be the particular function of the plurality of filters. Furthermore, video decoder 30 may reconstruct samples of the current picture of the video data, as described elsewhere in this disclosure. In response to determining based on the syntax element that the ALF is enabled, ALF unit 192 may apply the ALF to a reconstructed sample of the current picture.

In some examples, ALF unit 192 may determine, based on coded information, whether a bitstream includes a syntax element indicating whether an Adaptive Loop Filter (ALF) is enabled or disabled. Additionally, video decoder 30 may reconstruct a current picture of the video data, as described elsewhere in this disclosure. In response to determining that the ALF is enabled, ALF unit 192 may apply the ALF to a reconstructed sample of the current picture.

Figure 10:
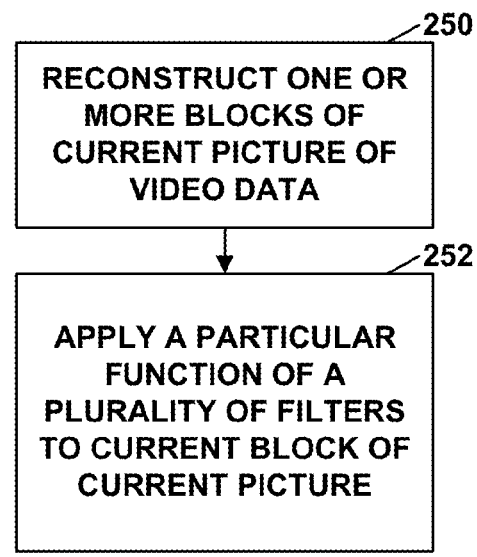
FIG. 10 is a flowchart illustrating an example operation for encoding or decoding video data, in accordance with one or more techniques of this disclosure.

FIG. 10 is a flowchart illustrating an example operation of a video coder, in accordance with one or more techniques of this disclosure. The flowcharts of this disclosure are provided as examples. In other examples, operations may include more, fewer or different actions. Moreover, actions may be performed in different orders.

In the example of FIG. 10, a computing device that comprises a video coder (e.g., video encoder 20 or video decoder 30) may reconstruct one or more blocks of a current picture of the video data (250). For instance, the video coder may reconstruct one or more CTBs of the current picture. The one or more blocks of the current picture comprise reconstructed samples of the current picture. Thus, reconstructing the one or more blocks comprises reconstructing samples of the current picture. For instance, in examples where the video coder is the video encoder shown in FIG. 8, inverse quantization unit 158, inverse transform processing unit 160, and summer 162 may reconstruct the one or more blocks of the current picture of the video data. In examples where the video coder is the video decoder shown in FIG. 9, prediction processing unit 181, inverse quantization unit 187, inverse transform processing unit 188, and summer 190 may reconstruct the one or more blocks of the current picture of the video data.

After reconstructing the one or more blocks of the current picture, the video coder may apply a particular function of a plurality of filters to a current block of the current picture (252). The current block does not necessarily correspond in size or shape to the one or more blocks used in the process of reconstructing the current picture. Rather, the current block as used here simply comprises reconstructed samples that are in the one or more blocks used in the process of reconstructing the current picture. In some examples where the video coder is the video encoder shown in FIG. 8, ALF unit 164 may apply the particular function of the plurality of filters to the current block. Furthermore, in instances where the video coder is a video encoder, the video encoder may use the filtered picture as a reference picture for encoding other pictures. In examples where the video coder is the video decoder shown in FIG. 9, ALF unit 192 may apply the particular function of the plurality of filters to the current block. Furthermore, in examples where the video coder is a video decoder, the video decoder may output the filtered picture. The video coder may apply the particular function of the plurality of filters in accordance with any of the examples provided elsewhere in this disclosure. For instance, the video coder may apply a linear function of the plurality of filters. In some examples, the plurality of filters includes, for each respective neighboring block of a plurality of neighboring blocks defined by a template, a respective filter associated with the respective neighboring block.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by fixed function and/or programmable processing circuitry, including one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. Thus, a "processor" comprises processing circuitry. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding or encoding video data, the method comprising:
   reconstructing, by a computing device, one or more blocks of a current picture of the video data, the one or more blocks of the current picture comprising reconstructed samples of the current picture;
   assigning, by the computing device, a plurality of class indexes to a current block of the current picture, the current block comprising the reconstructed samples of the current picture, each respective class index of the plurality of class indexes associated with a respective filter in a plurality of filters, wherein assigning the plurality of class indexes to the current block comprises:
      inheriting, by the computing device, a first class index of the plurality of class indexes from a block that neighbors the current block; and
      deriving, by the computing device, a second class index of the plurality of class indexes based on reconstructed samples within the current block; and
   after reconstructing the one or more blocks of the current picture, applying, by the computing device, a particular function of the plurality of filters to the current block wherein applying the particular function of the plurality of filters comprises applying, by the computing device, to a reconstructed sample of the current block, the filters associated with the plurality of class indexes assigned to the current block.

2. The method of claim 1, wherein the particular function is a linear function of the plurality of filters.

3. The method of claim 1, wherein:
   a template defines a plurality of neighboring blocks of the current picture that neighbor the current block, and a total number of filters in the plurality of filters is equal to a total number of blocks defined in the template.

4. The method of claim 1, wherein the plurality of filters consists of a number of filters, the method further comprising determining, by the computing device, based on a syntax element in a bitstream, the number of filters for the current block.

5. The method of claim 1, further comprising:
determining, by the computing device, the plurality of filters based on filters used by neighboring blocks in a template, the template being a geometrical pattern of blocks centered on the current block.

6. The method of claim 5, further comprising:
determining, by the computing device, the template based on one or more of: a slice type, a quantization parameter, a temporal identifier, whether the template is or is not referenced by another picture, or information signaled in one or more of: a sequence parameter header, a picture parameter header, or a slice header.

7. The method of claim 1, further comprising:
determining, by the computing device, based on a pre-defined mask, weighting factors used in the particular function, the pre-defined mask specifying mask values for a block in a template, the template being a geometrical pattern of blocks centered on the current block.

8. The method of claim 1, wherein:
the method further comprises obtaining, by the computing device, from a bitstream, data indicating weighting factors for a plurality of neighboring blocks,
for each respective neighboring block of the plurality of neighboring blocks, the plurality of filters includes a respective filter for the respective neighboring block, and
applying the particular function comprises using, by the computing device, the weighting factors for the neighboring blocks when applying the particular function.

9. The method of claim 1, wherein:
the method further comprises:
obtaining, by the computing device, from a bitstream, a syntax element indicating whether all weighting factors associated with neighboring blocks are equal to 0; and
based on the syntax element indicating not all weighting factors associated with the neighboring blocks are equal to 0, obtaining, by the computing device, from the bitstream, data indicating the weighting factors associated with the neighboring blocks, and
applying the particular function comprises using, by the computing device, the weighting factors associated with the neighboring blocks to apply the particular function.

10. The method of claim 1, further comprising determining two or more filters in the plurality of filters based on at least one of:
an activity level of the current block, or
a direction classification of the current block.

11. The method of claim 1, wherein:
applying the particular function comprises using, by the computing device, pre-defined weighting factors for selected filters of the plurality of filters to apply the particular function.

12. The method of claim 1, wherein:
the method further comprises: determining, by the computing device, based on syntax elements, weighting factors for selected filters of the plurality of filters, the syntax elements included in one or more of: a sequence parameter header, picture parameter header, or slice header; and
applying the particular function comprises using, by the computing device, the pre-defined weighting factors for selected filters of the plurality of filters to apply the particular function.

13. The method of claim 1, wherein:
the method further comprises determining, by the computing device, based on a position of the current block relative to a coding unit, prediction unit, or transform unit, or coding mode, weighting factors for selected filters of the plurality of filters; and
applying the particular function comprises using, by the computing device, the weighting factors for selected filters of the plurality of filters to apply the particular function.

14. The method of claim 1, wherein:
the method further comprises:
receiving, by the computing device, a bitstream comprising an encoded representation of a plurality of pictures of the video data, the plurality of pictures including the current picture, the current picture including a first block and a second block, the first block and the second block partially overlapping; and
determining, by the computing device, a class for the first block and a class for the second block, and
applying the particular function of the plurality of filters comprises:
applying, by the computing device, to each reconstructed sample of the first block, a filter associated with the class for the first block; and
applying, by the computing device, to each reconstructed sample of the second block, a filter associated with the class for the second block, such that the filter associated with the class for the first block and the filter associated with the class for the second block are both applied to reconstructed samples in overlapping parts of the first and second blocks.

15. The method of claim 1, wherein:
the plurality of filters includes an Adaptive Loop Filter (ALF),
the method further comprises determining, by the computing device, based on a merge or advanced motion vector prediction (AMVP) mode for a current prediction unit (PU) of the current block, a coded block flag (CBF) for the current block, or a block size of the current block, whether a bitstream includes a syntax element indicating whether an Adaptive Loop Filter (ALF) is enabled or disabled, wherein when the current PU of the current block has the AMVP mode, a motion vector difference (MVD) for the current PU and a motion vector predictor index for the current PU are signaled for the current PU, and
applying the particular function of the plurality of filters comprises, in response to determining that the ALF is enabled, applying, by the computing device, the ALF to a reconstructed sample of the current picture.

16. The method of claim 1, further comprising:
receiving, by the computing device, a bitstream comprising an encoded representation of a plurality of pictures of the video data.

17. The method of claim 1,
after applying the particular function of the plurality of filters to the current block, outputting, by the computing device, the current picture.

18. The method of claim 1, wherein:
reconstructing the one or more blocks of the current picture comprises, after encoding the one or more blocks of the current picture of the video data, reconstructing, by the computing device, the one or more blocks of the current picture, and
the method further comprises using, by the computing device, the current picture as a reference picture in encoding another picture of the video data.

19. The method of claim 18, wherein:
the method further comprises including, by the computing device, in a bitstream, data indicating weighting factors for neighboring blocks,
for each respective neighboring block of the neighboring blocks, the plurality of filters includes a respective filter for the respective neighboring block, and
applying the particular function comprises using, by the computing device, the weighting factors for the neighboring blocks when applying the particular function.

20. The method of claim 18, wherein:
the method further comprises:
including, by the computing device, in a bitstream, a syntax element indicating whether all weighting factors associated with neighboring blocks are equal to 0; and
based on the syntax element indicating not all weighting factors associated with the neighboring blocks are equal to 0, including, by the computing device, in the bitstream, data indicating the weighting factors associated with the neighboring blocks, and
applying the particular function comprises using, by the computing device, the weighting factors associated with the neighboring blocks to apply the particular function.

21. The method of claim 18, wherein:
the plurality of filters includes an Adaptive Loop Filter (ALF), and
the method further comprises including, by the computing device, in a bitstream that comprises an encoded representation of a current picture of the video data, a syntax element indicating whether the ALF is enabled or disabled, wherein the syntax element is signaled according to a depth of a type of tree other than a quad-tree.

22. The method of claim 18, wherein:
the method further comprises determining, by the computing device, based on a merge or advanced motion vector prediction (AMVP) mode, a coded block flag (CBF), or a block size, whether to include in a bitstream a syntax element indicating whether an Adaptive Loop Filter (ALF) is enabled or disabled, and
applying the particular function of the plurality of filters comprises, in response to determining that the ALF is enabled, applying, by the computing device, the ALF to a reconstructed sample of the current picture.

23. An apparatus for decoding or encoding video data, the apparatus comprising:
one or more storage media configured to store video data; and
one or more processors configured to:
reconstruct one or more blocks of a current picture of the video data, the one or more blocks of the current picture comprising reconstructed samples of the current picture;
assign a plurality of class indexes to a current block of the current picture, the current block comprising the reconstructed samples of the current picture, each respective class index of the plurality of class indexes associated with a respective filter in a plurality of filters, wherein the one or more processors are configured such that, as part of assigning the plurality of class indexes to the current block, the one or more processors:
inherit a first class index of the plurality of class indexes from a block that neighbors the current block; and
derive a second class index of the plurality of class indexes based on reconstructed samples within the current block; and
after reconstructing the one or more blocks of the current picture, apply a particular function of the plurality of filters to the current block, wherein the one or more processors are configured such that, as part of applying the particular function of the plurality of filters, the one or more processors apply, to a reconstructed sample of the current block, the filters associated with the plurality of class indexes assigned to the current block.

24. The apparatus of claim 23, wherein the particular function is a linear function of the plurality of filters.

25. The apparatus of claim 23, wherein:
a template defines a plurality of neighboring blocks of the current picture that neighbor the current block, and
a total number of filters in the plurality of filters is equal to a total number of blocks defined in the template.

26. The apparatus of claim 23, wherein the plurality of filters consists of a number of filters, the one or more processors further configured to determine, based on a syntax element in a bitstream, the number of filters for the current block.

27. The apparatus of claim 23, wherein the one or more processors are further configured to:
determine the plurality of filters based on filters used by neighboring blocks in a template, the template being a geometrical pattern of blocks centered on the current block.

28. The apparatus of claim 27, wherein the one or more processors are further configured to determine the template based on one or more of: a slice type, a quantization parameter, a temporal identifier, whether the template is or is not referenced by another picture, or information signaled in one or more of: a sequence parameter header, a picture parameter header, or a slice header.

29. The apparatus of claim 23, wherein the one or more processors are further configured to determine, based on a pre-defined mask, weighting factors used in the particular function, the pre-defined mask specifying mask values for a block in a template, the template being a geometrical pattern of blocks centered on the current block.

30. The apparatus of claim 23, wherein:
the one or more processors are further configured to obtain, from a bitstream, data indicating weighting factors for a plurality of neighboring blocks,
for each respective neighboring block of the plurality of neighboring blocks, the plurality of filters includes a respective filter for the respective neighboring block, and
the one or more processors are configured such that, as part of applying the particular function, the one or more processors use the weighting factors for the neighboring blocks when applying the particular function.

31. The apparatus of claim 23, wherein:
the one or more processors are further configured to:
obtain, from a bitstream, a syntax element indicating whether all weighting factors associated with neighboring blocks are equal to 0; and
based on the syntax element indicating not all weighting factors associated with the neighboring blocks are equal to 0, obtain, from the bitstream, data indicating the weighting factors associated with the neighboring blocks, and
the one or more processors are configured such that, as part of applying the particular function, the one or more processors use the weighting factors associated with the neighboring blocks to apply the particular function.

32. The apparatus of claim 23, wherein the one or more processors are further configured to determine two or more filters in the plurality of filters based on at least one of:
an activity level of the current block, or
a direction classification of the current block.

33. The apparatus of claim 23, wherein:
the one or more processors are configured such that, as part of applying the particular function, the one or more processors use pre-defined weighting factors for selected filters of the plurality of filters to apply the particular function.

34. The apparatus of claim 23, wherein:
the one or more processors are further configured to determine, based on syntax elements, weighting factors for selected filters of the plurality of filters, the syntax elements included in one or more of: a sequence parameter header, picture parameter header, or slice header; and
the one or more processors are configured such that, as part of applying the particular function, the one or more processors use the pre-defined weighting factors for selected filters of the plurality of filters to apply the particular function.

35. The apparatus of claim 23, wherein:
the one or more processors are further configured to determine, based on a position of the current block relative to a coding unit, prediction unit, or transform unit, or coding mode, weighting factors for selected filters of the plurality of filters; and
the one or more processors are configured such that, as part of applying the particular function, the one or more processors use the weighting factors for selected filters of the plurality of filters to apply the particular function.

36. The apparatus of claim 23, wherein:
the one or more processors are further configured to:
receive a bitstream comprising an encoded representation of a plurality of pictures of the video data, the plurality of pictures including the current picture, the current picture including a first block and a second block, wherein the first block and the second block are partially overlapping; and
determine a class for the first block and a class for the second block, and
the one or more processors are configured such that, as part of applying the particular function of the plurality of filters, the one or more processors:
apply to each reconstructed sample of the first block, a filter associated with the class for the first block; and
apply to each reconstructed sample of the second block, a filter associated with the class for the second block, such that the filter associated with the class for the first block and the filter associated with the class for the second block are both applied to reconstructed samples in overlapping parts of the first and second blocks.

37. The apparatus of claim 23, wherein:
the plurality of filters includes an Adaptive Loop Filter (ALF),
the one or more processors are further configured to determine, based on a merge or advanced motion vector prediction (AMVP) mode, a coded block flag (CBF), or a block size, whether a bitstream includes a syntax element indicating whether an Adaptive Loop Filter (ALF) is enabled or disabled, wherein when the current PU of the current block has the AMVP mode, a motion vector difference (MVD) for the current PU and a motion vector predictor index for the current PU are signaled for the current PU, and
the one or more processors are configured such that, as part of applying the particular function of the plurality of filters, the one or more processors, in response to determining that the ALF is enabled, apply the ALF to a reconstructed sample of the current picture.

38. The apparatus of claim 23, wherein the one or more processors are further configured to:
receive a bitstream comprising an encoded representation of a plurality of pictures of the video data.

39. The apparatus of claim 23, wherein the one or more processors are further configured to output, after applying the particular function of the plurality of filters to the current block, the current picture.

40. The apparatus of claim 23, wherein:
the one or more processors are configured such that, as part of reconstructing the current picture, the one or more processors, after encoding the current picture of the video data, reconstruct the current picture, and
the one or more processors are further configured to use the current picture as a reference picture in encoding another picture of the video data.

41. The apparatus of claim 40, wherein:
the one or more processors are further configured to include, in a bitstream, data indicating weighting factors for neighboring blocks,
for each respective neighboring block of the neighboring blocks, the plurality of filters includes a respective filter for the respective neighboring block, and
the one or more processors are configured such that, as part of applying the particular function, the one or more processors use the weighting factors for the neighboring blocks when applying the particular function.

42. The apparatus of claim 40, wherein:
the one or more processors are further configured to:
include, in a bitstream, a syntax element indicating whether all weighting factors associated with neighboring blocks are equal to 0; and
based on the syntax element indicating not all weighting factors associated with the neighboring blocks are equal to 0, include, in the bitstream, data indicating the weighting factors associated with the neighboring blocks, and
the one or more processors are configured such that, as part of applying the particular function, the one or more processors use the weighting factors associated with the neighboring blocks to apply the particular function.

43. The apparatus of claim 40, wherein:
the plurality of filters includes an Adaptive Loop Filter (ALF), and
the one or more processors are further configured to include, in a bitstream that comprises an encoded representation of a current picture of the video data, a syntax element indicating whether the ALF is enabled or disabled, wherein the syntax element is signaled according to a depth of a type of tree other than a quad-tree.

44. The apparatus of claim 40, wherein:
the one or more processors are further configured to determine, based on a merge or advanced motion vector prediction (AMVP) mode, a coded block flag (CBF), or a block size, whether to include in a bitstream a syntax element indicating whether an Adaptive Loop Filter (ALF) is enabled or disabled, and
the one or more processors are configured such that, as part of applying the particular function of the plurality of filters, the one or more processors, in response to determining that the ALF is enabled, apply the ALF to a reconstructed sample of the current picture.

45. The apparatus of claim 23, wherein the apparatus comprises at least one of:
an integrated circuit;
a microprocessor; or
a wireless communication device.

46. The apparatus of claim 23, further comprising a display configured to display decoded video data.

47. The apparatus of claim 23, further comprising a camera configured to capture the video data.

48. An apparatus for decoding or encoding video data, the apparatus comprising:
means for reconstructing one or more blocks of a current picture of the video data, the one or more blocks of the current picture comprising reconstructed samples of the current picture;
means for assigning a plurality of class indexes to a current block of the current picture, the current block comprising the reconstructed samples of the current picture, each respective class index of the plurality of class indexes associated with a respective filter in a plurality of filters, wherein assigning the plurality of class indexes to the current block comprises:
inheriting, by the computing device, a first class index of the plurality of class indexes from a block that neighbors the current block; and
deriving, by the computing device, a second class index of the plurality of class indexes based on reconstructed samples within the current block; and
means for applying, after reconstructing the current picture, a particular function of the plurality of filters to the current block, wherein the means for applying the particular function of the plurality of filters comprises means for applying to a reconstructed sample of the current block, the filters associated with the plurality of class indexes assigned to the current block.

49. A non-transitory computer-readable data storage medium having instructions stored thereon that, when executed, configure a device for decoding or encoding video data to:
reconstruct one or more blocks of a current picture of the video data, the one or more blocks of the current picture comprising reconstructed samples of the current picture;
assign a plurality of class indexes to a current block of the current picture, the current block comprising the reconstructed samples of the current picture, each respective class index of the plurality of class indexes associated with a respective filter in a plurality of filters, wherein, as part of configuring the device to assign the plurality of class indexes to the current block, execution of the instructions configures the device to:
inherit a first class index of the plurality of class indexes from a block that neighbors the current block; and
derive a second class index of the plurality of class indexes based on reconstructed samples within the current block; and
after reconstructing the one or more blocks of the current picture, apply a particular function of the plurality of filters to the current block, wherein, as part of configuring the device to apply the particular function of the plurality of filters, execution of the instructions configures the device to apply, to a reconstructed sample of the current block, the filters associated with the plurality of class indexes assigned to the current block.

* * * * *